US009032595B2

United States Patent
Lin

(10) Patent No.: US 9,032,595 B2
(45) Date of Patent: May 19, 2015

(54) DOUBLE LOCKING SAFETY SNAP HOOK

(71) Applicant: USANG INDUSTRIAL CO., LTD., Taipei (TW)

(72) Inventor: Yu-Wen Lin, Taipei (TW)

(73) Assignee: USANG INDUSTRIAL CO., LTD., Taipei (TW)

( * ) Notice: Subject to any disclaimer, the term of this patent is extended or adjusted under 35 U.S.C. 154(b) by 36 days.

(21) Appl. No.: 14/053,800

(22) Filed: Oct. 15, 2013

(65) Prior Publication Data

US 2014/0110956 A1    Apr. 24, 2014

(30) Foreign Application Priority Data

Oct. 22, 2012  (TW) .............................. 101220350 U

(51) Int. Cl.
*F16B 45/02* (2006.01)
*B66C 1/36* (2006.01)

(52) U.S. Cl.
CPC .. *B66C 1/36* (2013.01); *F16B 45/02* (2013.01)

(58) Field of Classification Search
CPC .................................. F16B 45/02; B66C 1/36
USPC ............ 24/600.1, 601.1, 599.5, 599.6, 599.9
See application file for complete search history.

(56) References Cited

U.S. PATENT DOCUMENTS

| | | | | |
|---|---|---|---|---|
| 5,579,564 A * | 12/1996 | Rullo et al. | ................... | 24/599.5 |
| 5,735,025 A * | 4/1998 | Bailey | ........................ | 24/600.1 |
| 6,832,417 B1 * | 12/2004 | Choate | ........................ | 24/600.1 |
| 7,437,806 B2 * | 10/2008 | Lin | ............... | 24/599.5 |
| 8,499,423 B2 * | 8/2013 | Yang | ........................ | 24/600.1 |
| 8,544,155 B2 * | 10/2013 | Lin | ............... | 24/600.1 |
| 8,752,254 B2 * | 6/2014 | Perner | ........................ | 24/599.5 |
| 2007/0062014 A1 * | 3/2007 | Casebolt | ..................... | 24/600.1 |
| 2008/0104809 A1 * | 5/2008 | Lin | ............... | 24/600.1 |
| 2008/0127465 A1 * | 6/2008 | Lin | ............... | 24/600.1 |
| 2008/0174130 A1 * | 7/2008 | Lin | ............... | 294/82.2 |
| 2009/0049663 A1 * | 2/2009 | Hong | ......................... | 24/600.1 |
| 2011/0113602 A1 * | 5/2011 | Chen | .......................... | 24/599.5 |
| 2011/0126386 A1 * | 6/2011 | Liang | ......................... | 24/599.5 |
| 2012/0042487 A1 * | 2/2012 | Yang | ........................ | 24/599.5 |
| 2012/0102688 A1 * | 5/2012 | Yang | ........................ | 24/600.1 |
| 2012/0210542 A1 * | 8/2012 | Yang | ............................. | 24/369 |
| 2013/0160252 A1 * | 6/2013 | Lin | ............... | 24/601.5 |
| 2013/0219673 A1 * | 8/2013 | Perner | .......................... | 24/375 |
| 2014/0230199 A1 * | 8/2014 | Perner | ....................... | 24/594.11 |
| 2014/0373319 A1 * | 12/2014 | Lin | ............... | 24/599.5 |

\* cited by examiner

*Primary Examiner* — Victor Batson
*Assistant Examiner* — Jason W San
(74) *Attorney, Agent, or Firm* — DLA Piper LLP (US)

(57) ABSTRACT

A safety snap hook includes a body defining a hook throat opening, a pivotable gate biased to close the hook throat opening, a pivotable trigger extending through an aperture in the gate and biased to press against a locking surface of the gate, and a pivotable locking member biased to a locking position whereat rotation of the gate relative to the body is prevented. When free ends of the trigger and the locking member are rotated toward the body to remove the trigger from the locking surface and rotate the locking member to a release position, the gate can be rotated relative to the body to open the hook throat opening.

15 Claims, 30 Drawing Sheets

DOUBLE LOCKING SAFETY SNAP HOOK

CROSS-REFERENCE TO RELATED APPLICATION

This application claims priority of Taiwanese Application No. 101220350, filed on Oct. 22, 2012.

BACKGROUND OF THE INVENTION

1. Field of the Invention

This invention relates to a safety snap hook, and more particularly to a double locking safety snap hook.

2. Description of the Related Art

Safety snap hooks are used widely in construction. U.S. Pat. No. 6,832,417 discloses a conventional safety snap hook including a gate that is used to close a hook throat opening and that can be released through only operation of a trigger. The conventional safety snap hook has a drawback. That is, the hook throat opening may be opened due to inadvertent or undesired contact of an user or an object, thereby affecting adversely safety of the user and resulting in a reduced reliability of the conventional safety snap hook.

SUMMARY OF THE INVENTION

The object of this invention is to provide a double locking safety snap hook that has an improved reliability.

According to this invention, a safety snap hook includes a body defining a hook throat opening, a pivotable gate biased to close the hook throat opening, a pivotable trigger extending through an aperture in the gate and biased to press against a locking surface of the gate, and a pivotable locking member biased to a locking position whereat rotation of the gate relative to the body is prevented. When free ends of the trigger and the locking member are rotated toward the body to remove the trigger from the locking surface and rotate the locking member to a release position, the gate can be rotated relative to the body to open the hook throat opening.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
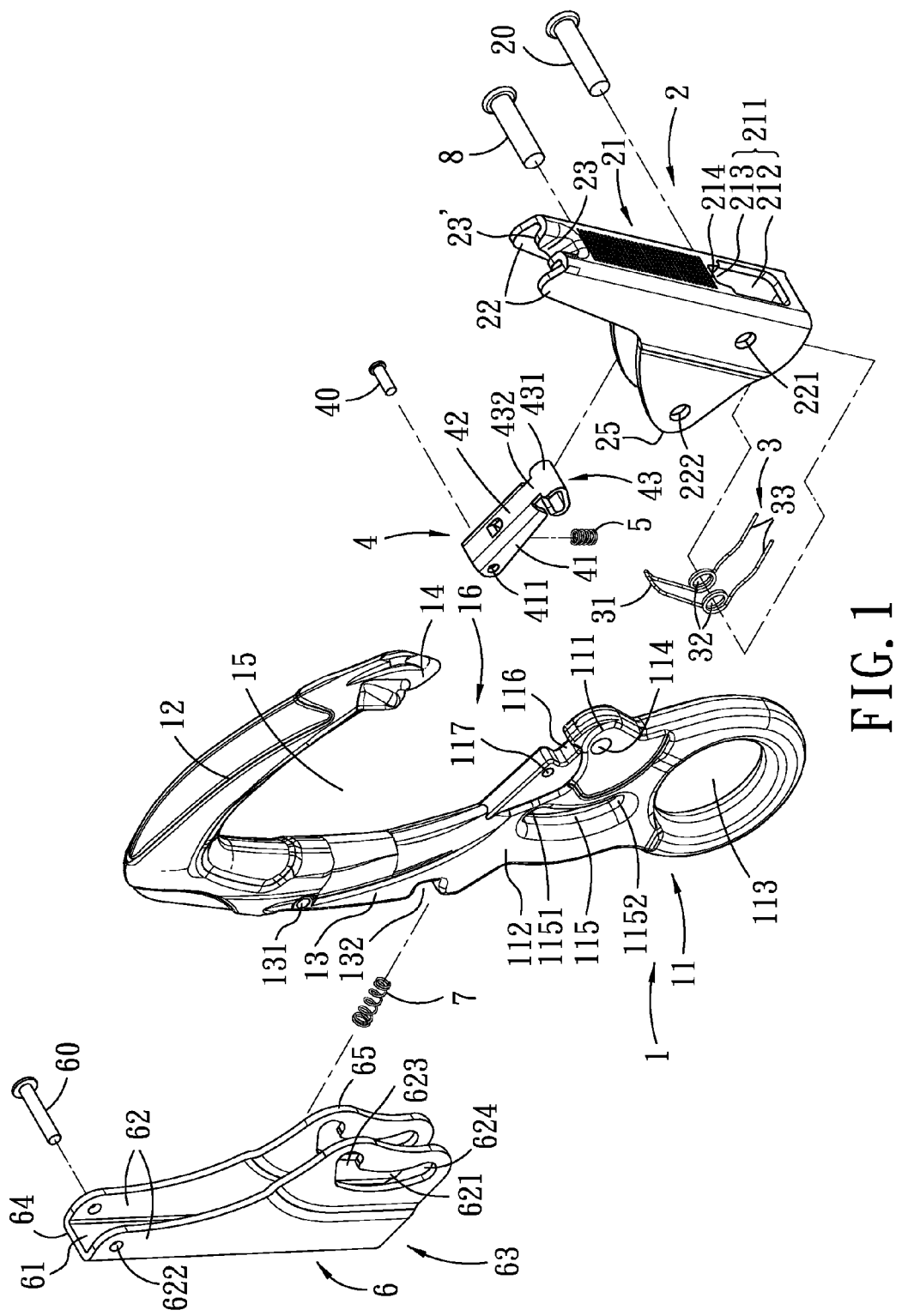
FIG. 1 is an exploded perspective view of the first preferred embodiment of a double locking safety snap hook according to this invention.

Before the present invention is described in greater detail in connection with the preferred embodiments, it should be noted that similar elements and structures are designated by like reference numerals throughout the entire disclosure.

Figure 2:
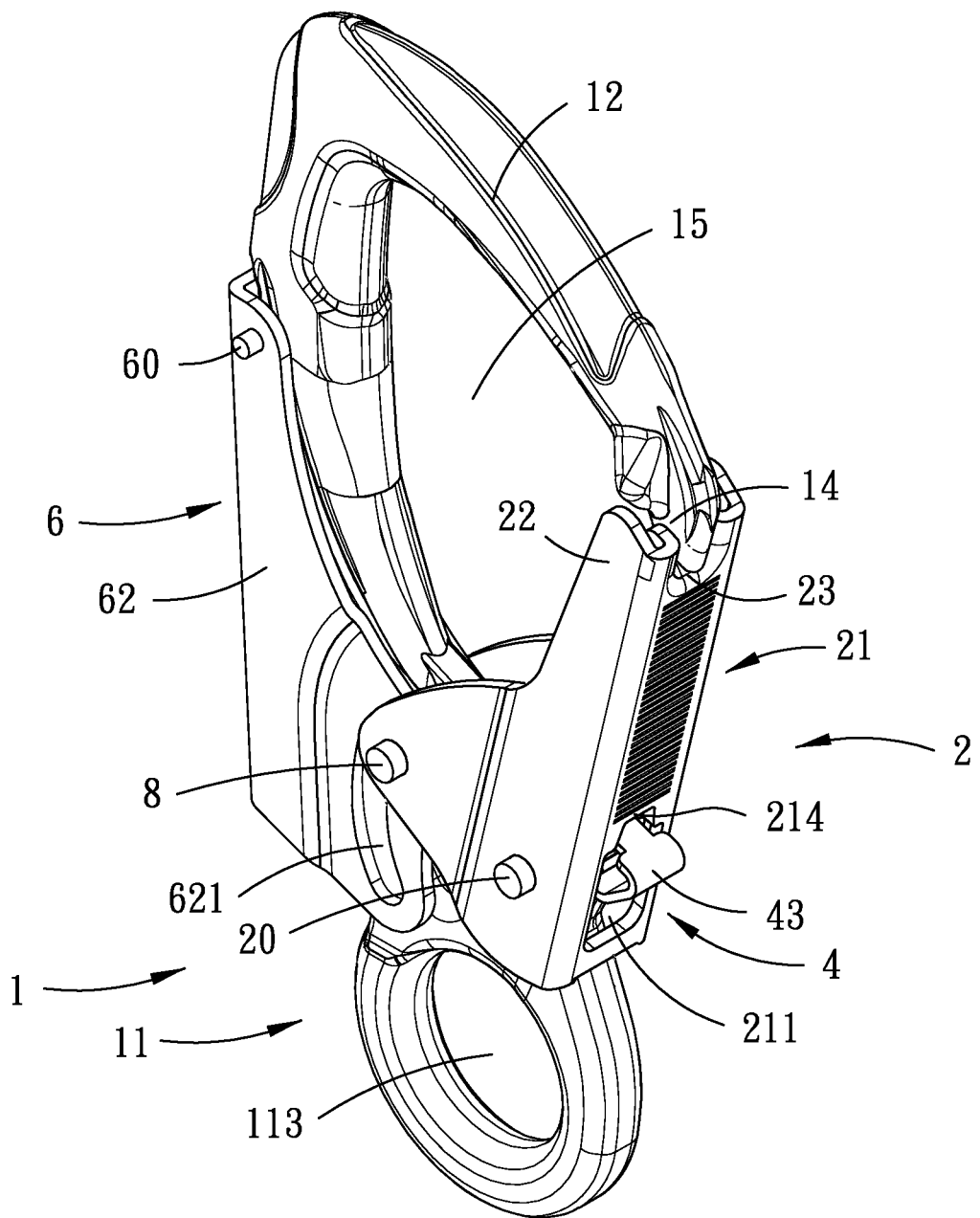
FIG. 2 is an assembled perspective view of the first preferred embodiment.
Figure 3:
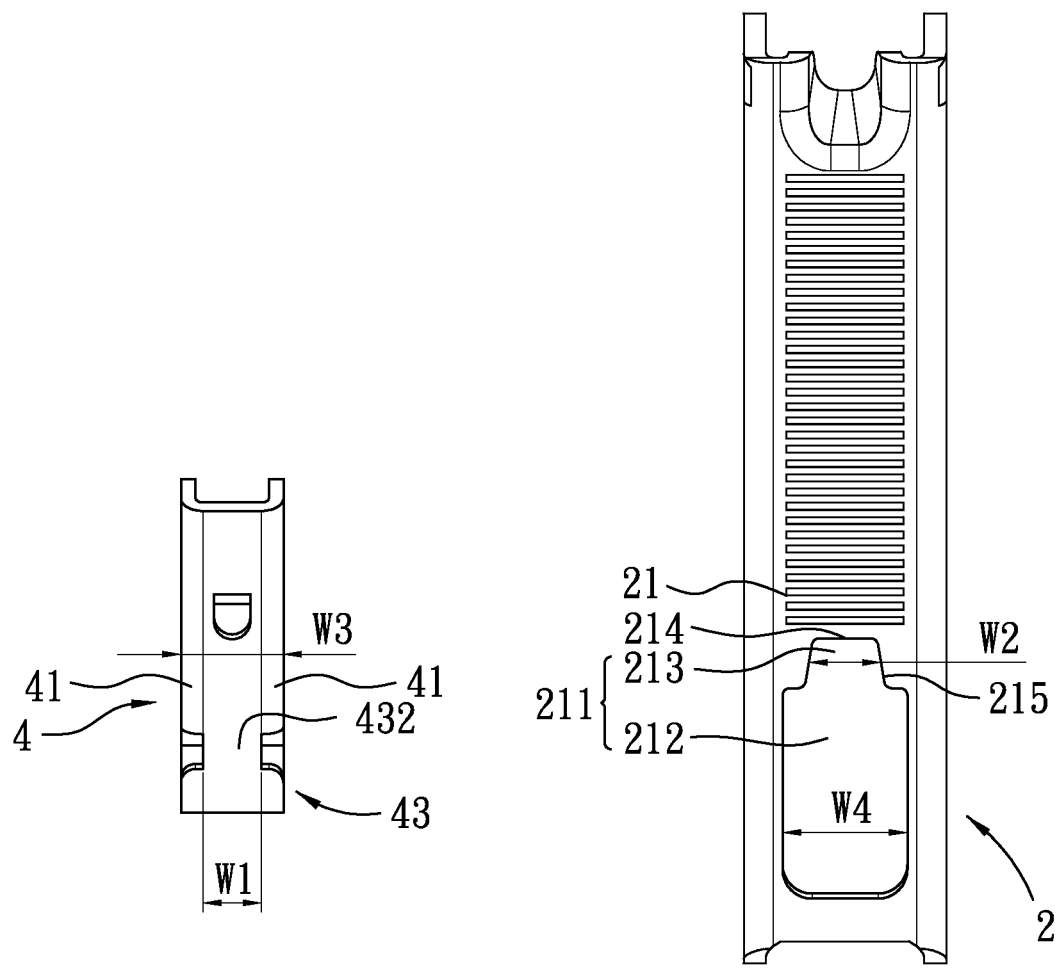
FIG. 3 is an exploded top perspective view of a gate and a trigger of the first preferred embodiment, illustrating relationships between sizes of the trigger and an aperture of the gate.

Referring to FIGS. 1, 2, and 3, the first preferred embodiment of a double locking safety snap hook according to this invention includes a body 1, a gate 2, a first pivot 20, a first resilient member 3, a trigger 4, a second pivot 40, a second resilient member 5, a locking member 6, a third pivot 60, a third resilient member 7, and a sliding rod 8. The gate 2 is disposed in front of the body 1. The locking member 6 is disposed behind the body 1.

The body 1 includes a base portion 11, a hook portion 12, a shank 13 connected between the base portion 11 and the hook portion 12, a stop projection 14 formed at a distal end of the hook portion 12, and a receiving space 15 defined among the base portion 11, the hook portion 12, the shank 13, and the stop projection 14 for hanging a retaining ring (not shown) or an article (not shown) to be fastened. The base portion 11 has a front side 111 cooperating with the hook portion 12 to define a hook throat opening 16 in spatial communication with the receiving space 15, a rear side 112 connected to the shank 13, a ring formed with a circular hole 113, a first pivot hole 114 adjacent to the front side 111, and an arc-shaped first slide slot 115 centered around the first pivot hole 114. The circular hole 113 is adapted for extension of a rope (not shown). The first slide slot 115 has an upper end 1151 distal from the circular hole 113, and a lower end 1152 proximate to the circular hole 113.

The first pivot 20 extends through the gate 2 and the first pivot hole 114 in the base portion 11 so as to allow for rotation of the gate 2 relative to the base portion 11. The gate 2 has a middle wall 21, two parallel sidewalls 22 extending respectively from two opposite sides of the middle wall 21 toward the shank 13, a notch 23 formed at an upper end of the middle wall 21, a front side 24, and a rear side 25. Each of the sidewalls 22 is formed with a pivot hole 221 for extension of the first pivot 20.

The first resilient member 3 is configured as a torsion spring, and a first end 31 abutting against the base portion 11, a coiled portion 32 sleeved on the first pivot 20, and a second end 33 abutting against the gate 2, so as to bias the gate 2 to close the hook throat opening 16.

To mount the trigger 4 and the second resilient member 5, the base portion 11 of the body 1 further has a second-spring receiving groove 116 adjacent to the front side 111, and a second pivot hole 117 disposed between the front and rear sides 111, 112 and adjacent to the second-spring receiving groove 116, and the middle wall 21 of the gate 2 is formed with an aperture 211 adjacent to the base portion 11. The aperture 211 has a main aperture section 212 and a positioning section 213 that is connected to an upper end of the main aperture section 212. The gate 2 further has a locking surface 214 defining an upper end of the positioning section 213, and two inner surfaces 215 defining respectively two opposite sides of the positioning section 213. As such, the positioning section 213 is located between the main aperture section 212 and the locking surface 214.

The trigger 4 has two parallel sidewalls 41, a connecting wall 42 connected between and perpendicular to the sidewalls 41, and a pressing section 43 extending from an end of the connecting wall 42 and constituting a free end of the trigger 4. Each of the sidewalls 41 is formed with a pivot hole 411. The base portion 11 of the body 1 is disposed between the sidewalls 41. The second pivot pin 40 extends through the pivot holes 411 in the sidewalls 41 of the trigger 4 and the second pivot hole 117 in the base portion 11 so as to allow for rotation of the trigger 4 relative to the base portion 11. The pressing section 43 extends through the aperture 211 in the gate 2, and has a curled head portion 431 extending outwardly from the aperture 211, and a neck portion 432 connected between the head portion 431 and the connecting wall 42 and narrower than the head portion 431 and the positioning section 213 of the aperture 211. That is, the width (W1) of the neck portion 432 is slightly smaller than the width (W2) of the positioning section 213 of the aperture 211. The distance (W3) between the sidewalls 41 of the trigger 4 is slightly smaller than the width (W4) of the main aperture section 212.

The second resilient member 5 is configured as a coiled compression spring, and has an upper end abutting against the trigger 4, and a lower end received within the second-spring receiving groove 116 in the base portion 11.

To mount the locking member 6 and the third resilient member 7, the shank 13 of the body 1 has a third pivot hole 131 formed in an upper end thereof (i.e., an end proximate to the hook portion 12), and a third-spring receiving groove 132 formed at a lower end thereof (i.e., an end proximate to the base portion 11). In addition, the locking member 6 has a middle wall 61, two sidewalls 62 extending respectively from two opposite sides of the middle wall 61 toward the shank 13, a free end 63, a rear side 64, and a front side 65. Each of the sidewalls 62 is formed with a second slide slot 621 adjacent to the front side 65. The free end 63 is spaced apart from and adjacent to the rear side 112 of the base portion 11.

Each of the sidewalls 62 is formed with a pivot hole 622. The shank 13 is disposed between the sidewalls 62. The third pivot 60 extends through the pivot holes 622 of the sidewalls 62 and the third pivot hole 131 so as to allow for rotation of the locking member 6 relative to the body 1. Each of the second slide slots 621 has an upper end 623 and a lower end 624.

The third resilient member 7 is configured as a coiled compression spring, and has one end abutting against the locking member 6, and the other end received within the third-spring receiving groove 132 in the shank 13.

Figure 4:
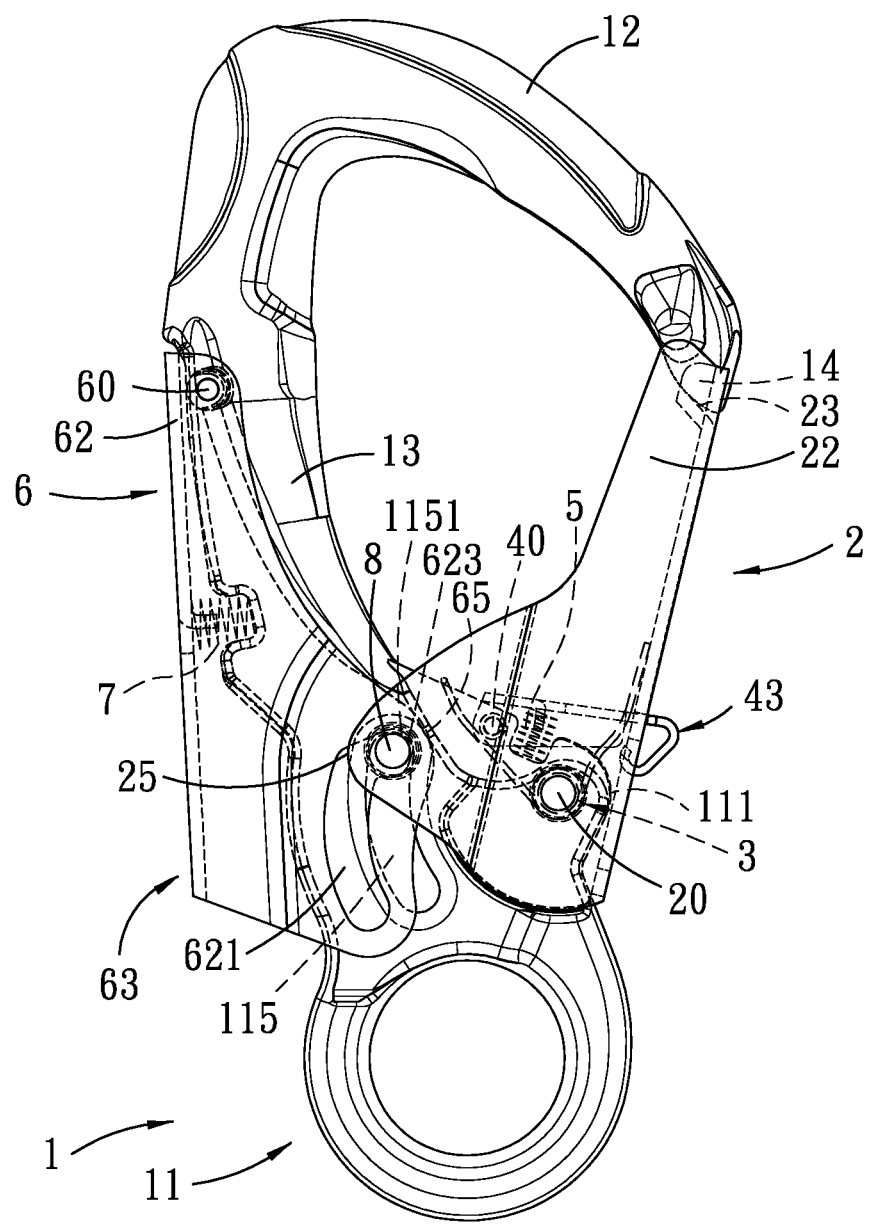
FIG. 4 is a side view of the first preferred embodiment when a hook throat opening is closed.

The front side 65 of the locking member 6 is disposed within the rear side 25 of the gate 2. That is, the sidewalls 62 of the locking member 6 is disposed between the sidewalls 22 of the gate 2. The sliding rod 8 is secured within holes 222 in the sidewalls 22 of the gate 2, and extends through the first and second slide slots 115, 621. With particular reference to FIG. 4, when the hook throat opening 16 is closed by the gate 2, the third pivot 60 extends through the upper ends 1151, 623 in the first and second slide slots 115, 621 of the base portion 11 and the locking member 6, and the lower ends 1152, 624 of the first and second slide slots 115, 621 are misaligned from each other such that movement of the sliding rod 8 from the upper ends 1151, 623 toward the lower ends 1152, 624 is prevented.

Figure 5:
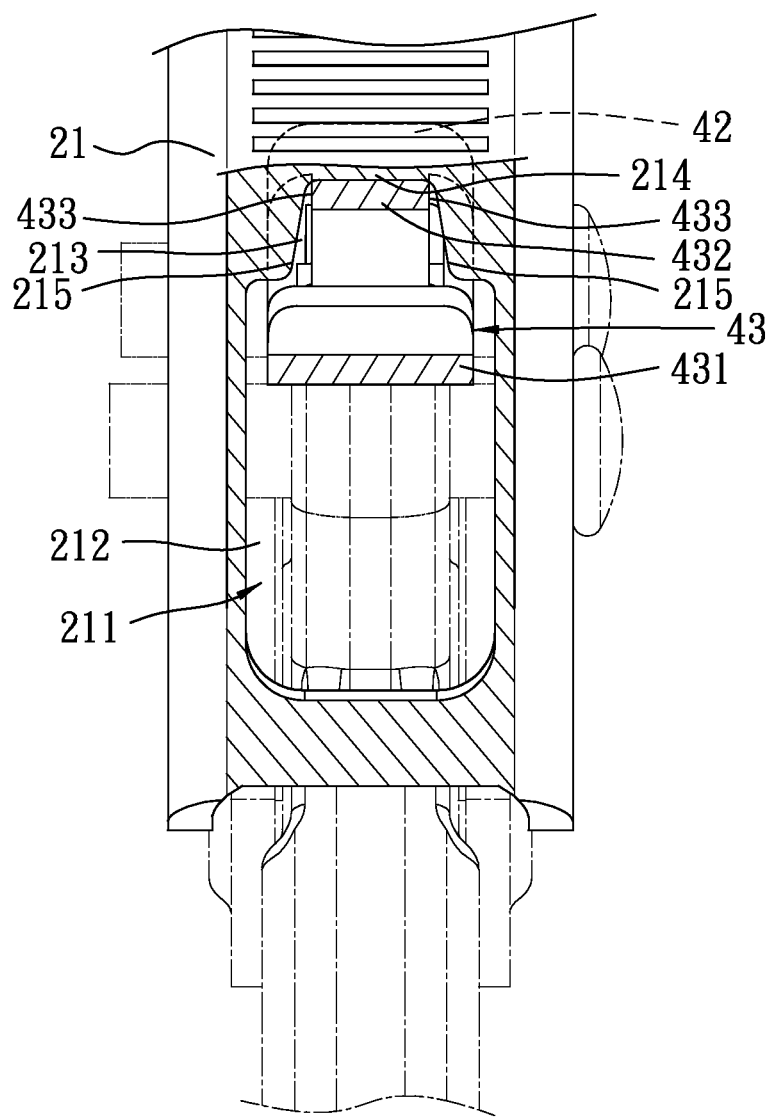
FIG. 5 is a fragmentary schematic sectional view of the first preferred embodiment, illustrating contact between a locking surface of the gate and a neck portion of the trigger.

With particular reference to FIG. 1, the notch 23 of the gate 2 is defined by a curved flange 23'. When the hook throat opening 16 is closed by the gate 2, as shown in FIGS. 2, 4, and 5, the distal end of the hook portion 12 is disposed within the notch 23 in the gate 2, and the flange 23' abuts against the stop projection 14. In this state, the pressing section 43 of the trigger 4 extends through the positioning section 213 of the aperture 211, in such a manner that the neck portion 432 is biased by the second resilient member 5 to press against the locking surface 214, thereby preventing rotation of the gate 2 relative to the body 1. In other words, the hook throat opening 16 is prevented from opening. Also in this state, the free end 63 of the locking member 6 is biased by the third resilient member 7 to a locking position, so that the lower ends 1152, 624 are misaligned from each other, thereby further preventing rotation of the gate 2 relative to the body 1.

The hook throat opening 16 can be opened by a first method or a second method.

Figure 6:
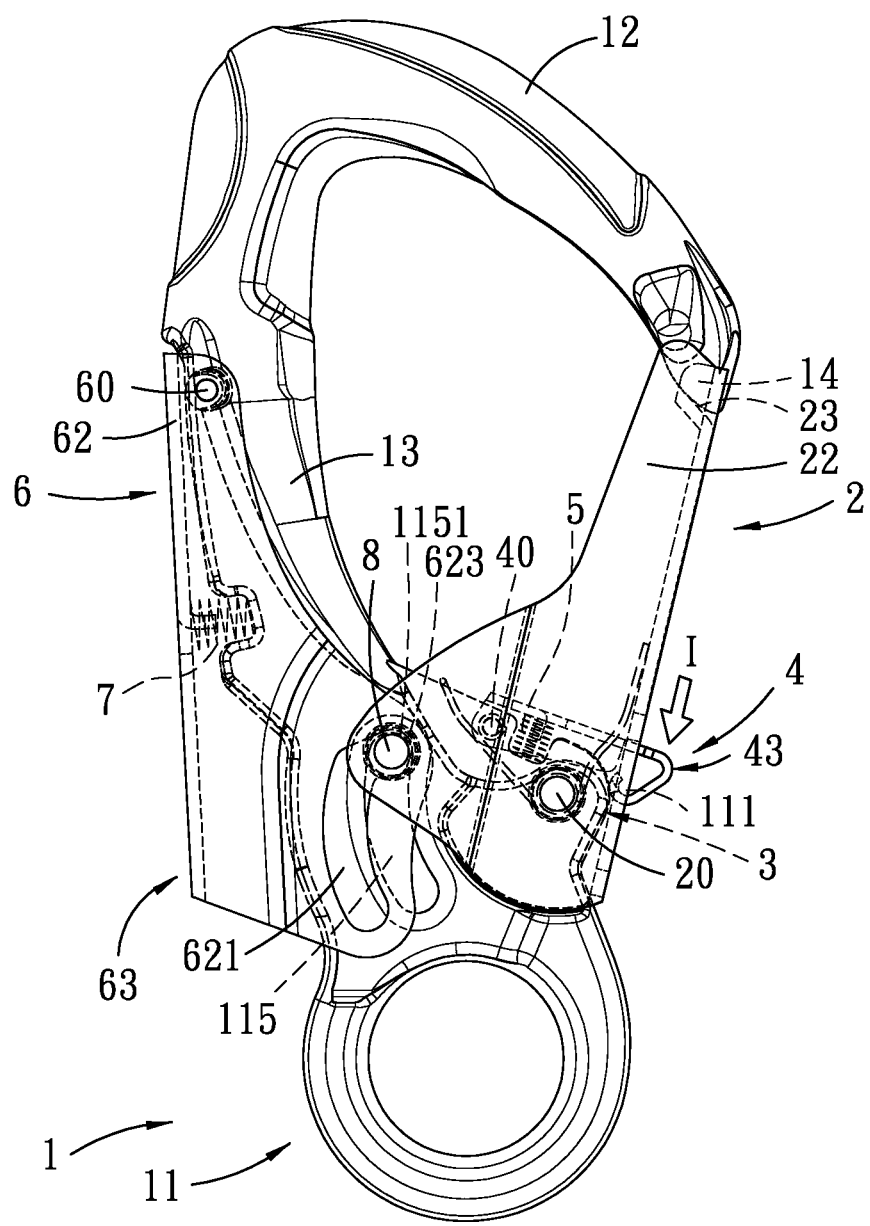
FIG. 6 is a view similar to FIG. 4 but illustrating a first step of a first method for opening the hook throat opening.
Figure 7:
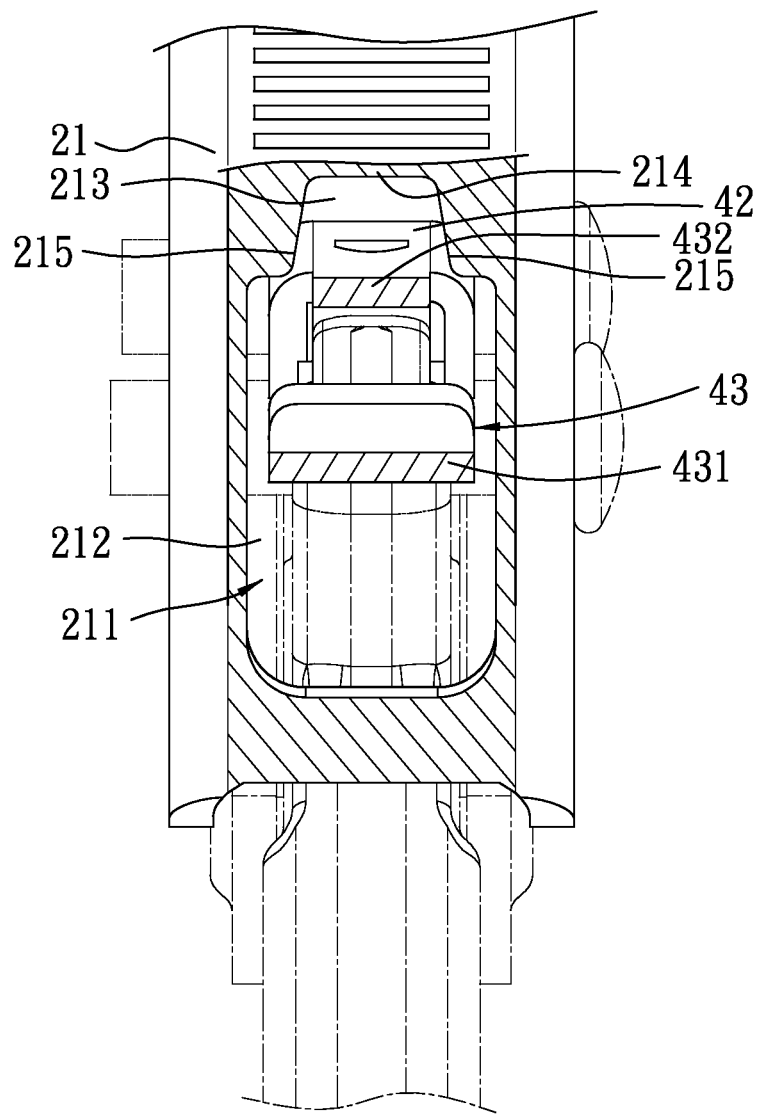
FIG. 7 is view similar to FIG. 5 but illustrating that the neck portion of the trigger is removed from the locking surface of the gate.
Figure 8:
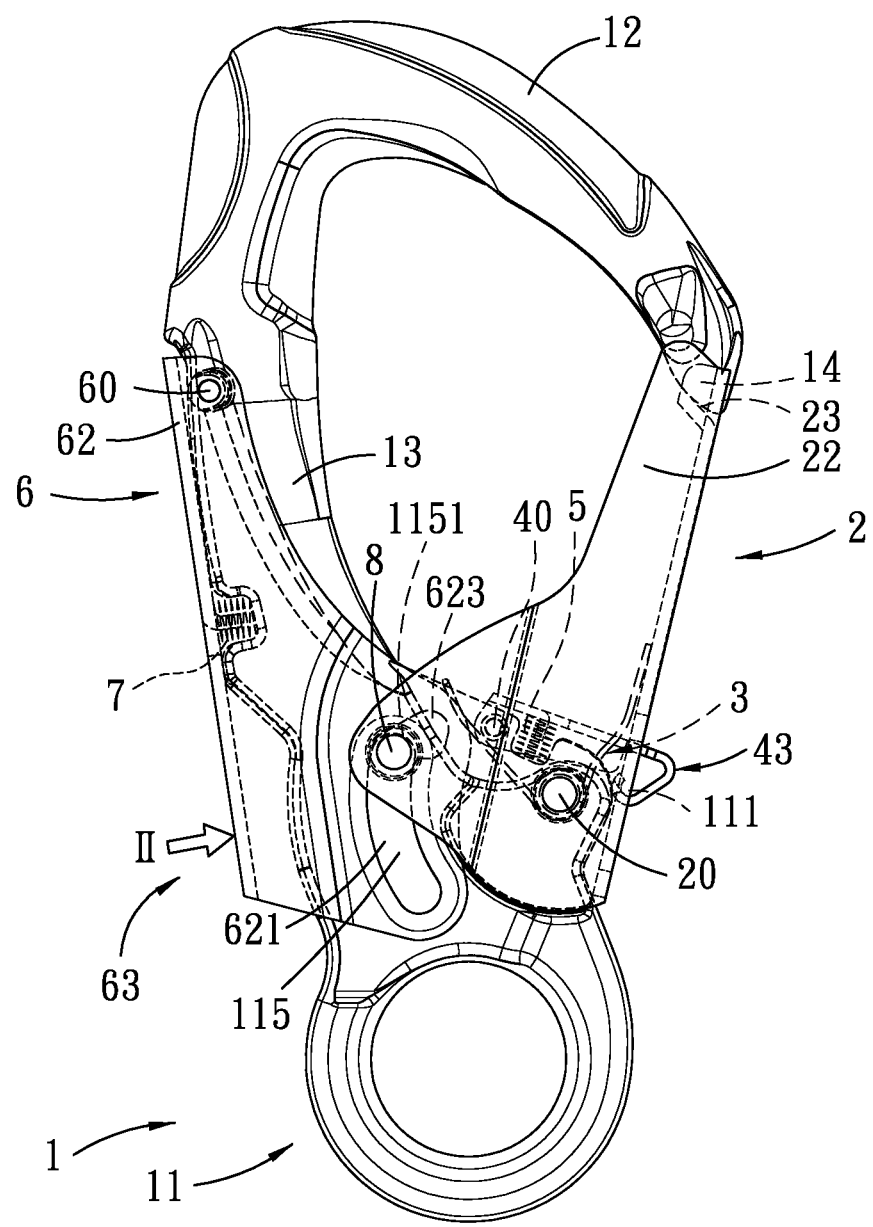
FIG. 8 is a view similar to FIG. 4 but illustrating a second step of the first method for opening the hook throat opening.
Figure 9:
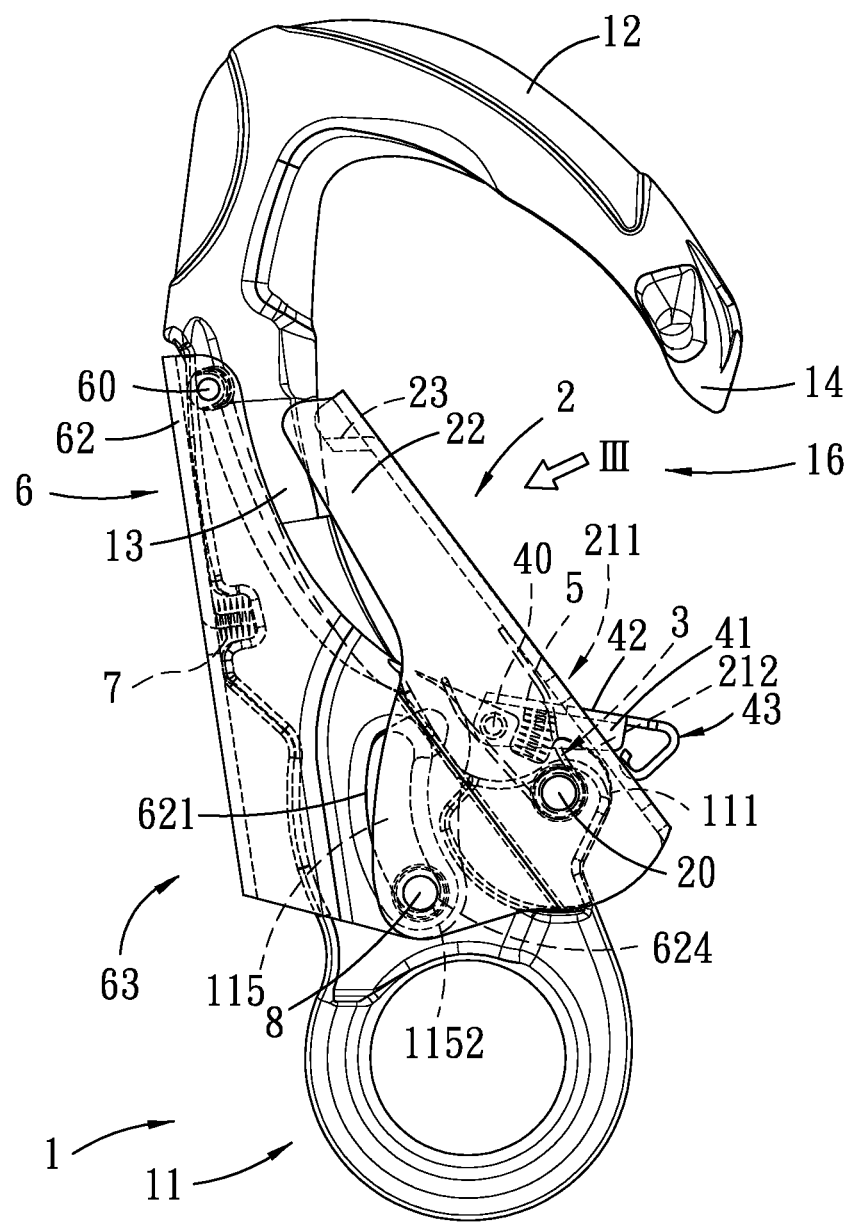
FIG. 9 is a view similar to FIG. 4 but illustrating a third step of the first method for opening the hook throat opening.

The first method of the first preferred embodiment includes the following steps:

1. as shown in FIG. 6, pressing the free end 43 of the trigger 4 in a direction (I) to rotate about the second pivot 40 toward the base portion 11 to contact the base portion 11 so as to remove the neck portion 432 of the pressing section 43 from the locking surface 214, so that the pressing section 43 is disposed within the main aperture section 212 of the aperture 211, as shown in FIG. 7, and abuts against the base portion 11;
2. as shown in FIG. 8, pressing the free end 63 of the locking member 6 in a direction (II) to rotate about the third pivot 60 to contact the base portion 11, so as to rotate the locking member to a release position, thereby aligning the lower end 1152 of the first slide slot 115 with the lower ends 624 of the second slide slots 621 in a direction parallel to the third pivot 60; and
3. as shown in FIG. 9, applying a force to the gate 2 in a direction (III) to rotate about the first pivot 20 to thereby remove the gate 2 from the hook throat opening 16, such that the sliding rod 8 moves from the upper ends 1151, 623 of the first and second slide slots 115, 621 toward the lower ends 1152, 624 of the first and second slide slots 115, 621.

When all of the gate 2, the trigger 4, and the locking member 6 are released, they are biased by the first, second, and third resilient members 3, 5, 7 to return to their original positions shown in FIG. 4.

Figure 10:
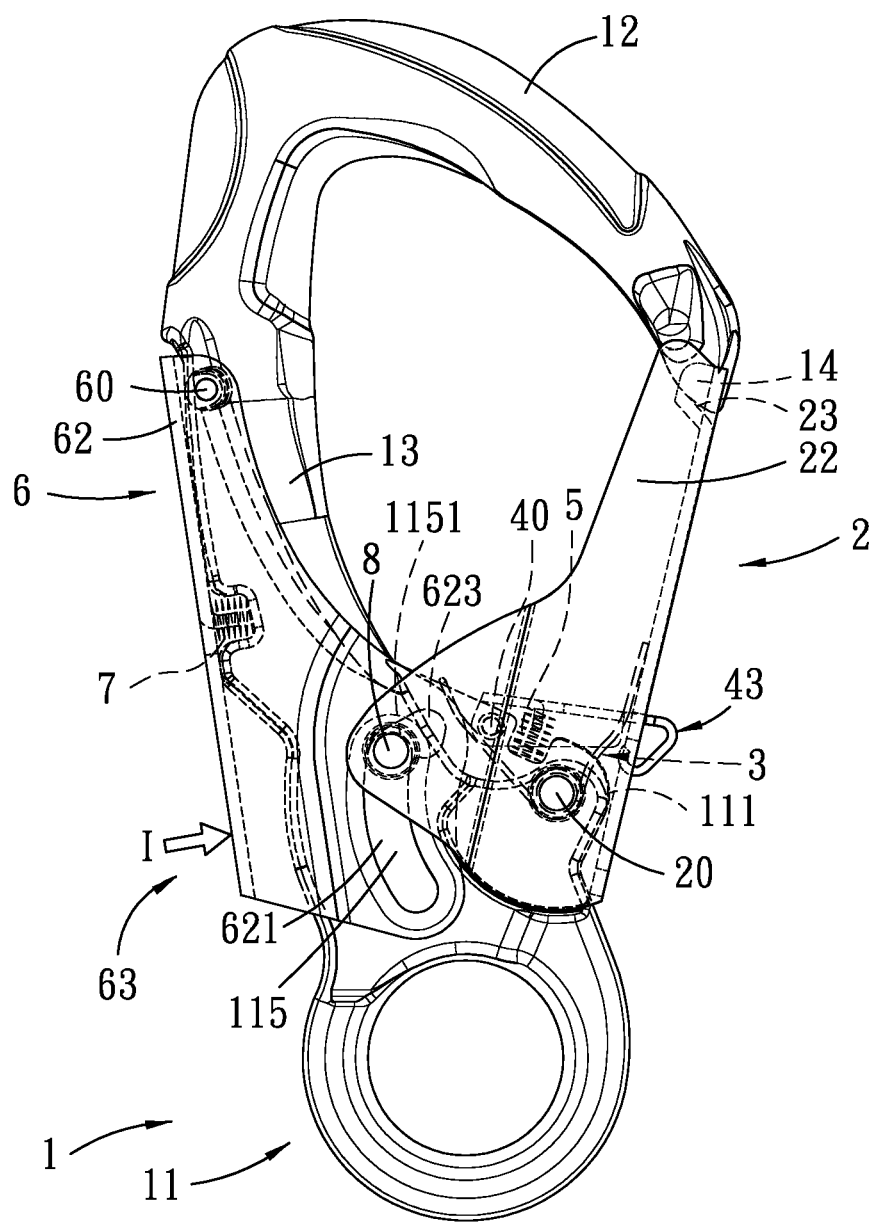
FIG. 10 is a view similar to FIG. 4 but illustrating a first step of a second method for opening the hook throat opening.
Figure 11:
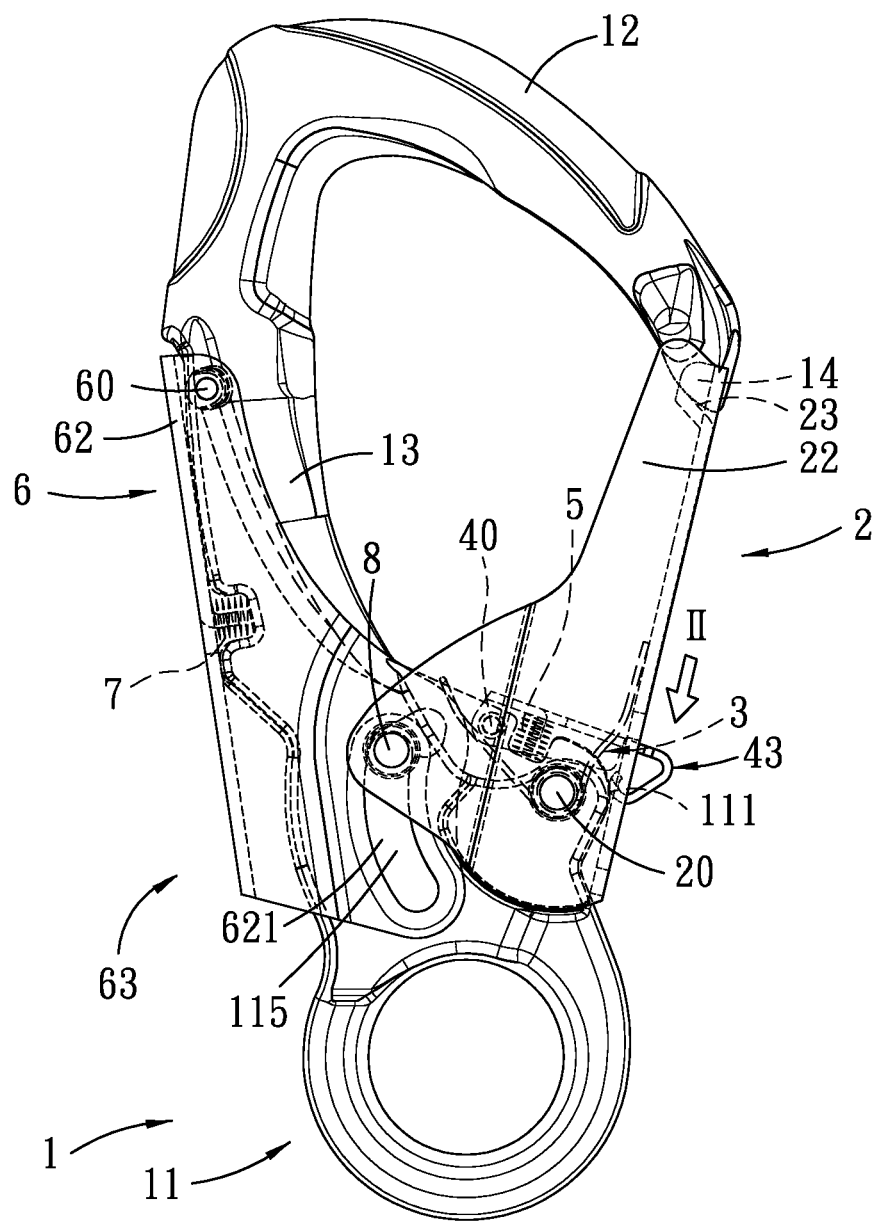
FIG. 11 is a view similar to FIG. 4 but illustrating a second step of the second method for opening the hook throat opening.
Figure 12:
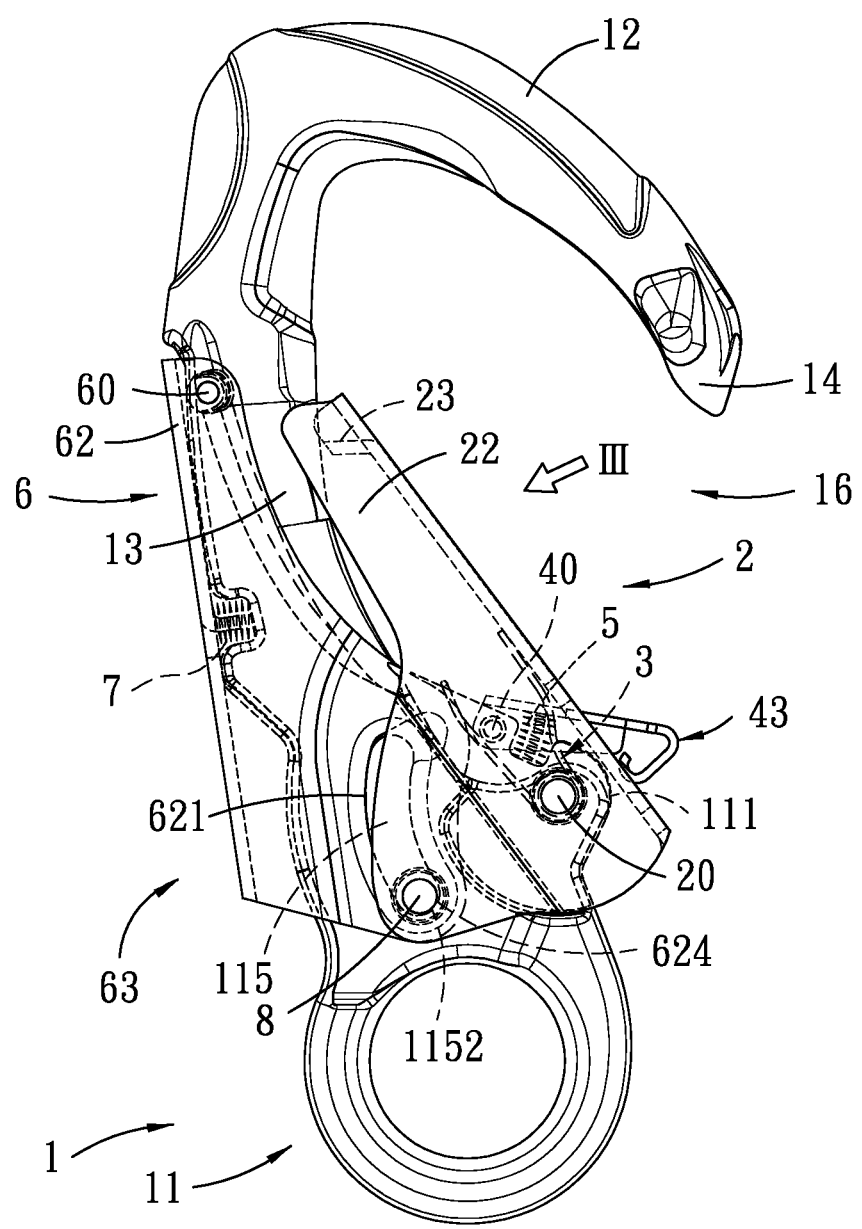
FIG. 12 is a view similar to FIG. 4 but illustrating a third step of the second method for opening the hook throat opening.

The second method of the first preferred embodiment includes the following steps:
1. as shown in FIG. 10, pressing the free end 63 of the locking member 6 in a direction (I) to rotate about the third pivot 60 to contact the base portion 11, so as to rotate the locking member to a release position, thereby aligning the lower end 1152 of the first slide slot 115 with the lower ends 624 of the second slide slots 621 in a direction parallel to the third pivot 60;
2. as shown in FIGS. 7 and 11, pressing the free end 43 of the trigger 4 in a direction (II) to rotate about the second pivot 40 toward the base portion 11 to contact the base portion 11 so as to remove the neck portion 432 of the pressing section 43 from the locking surface 214, so that the pressing section 43 is disposed within the main aperture section 212 of the aperture 211, as shown in FIG. 7, and abuts against the base portion 11; and
3. as shown in FIG. 12, applying a force to the gate 2 in a direction (III) to rotate about the first pivot 20 to thereby remove the gate 2 from the hook throat opening 16, such that the sliding rod 8 moves from the upper ends 1151, 623 of the first and second slide slots 115, 621 toward the lower ends 1152, 624 of the first and second slide slots 115, 621.

In the first and second methods, one of the free ends 43, 63 of the trigger 4 and the locking member 6 is operated prior to operation of the other of the free ends 43, 63 of the trigger 4 and the locking member 6.

Since it is necessary to operate the trigger 4 and the locking member 6 in order to open the hook throat opening 16, and the trigger 4 and the locking member 6 are disposed respectively at front and rear sides of the body 1, the safety snap hook cannot be opened due to inadvertent or undesired contact by a user or an article, thereby promoting the reliability of the safety snap hook and safety of the user.

Figure 13:
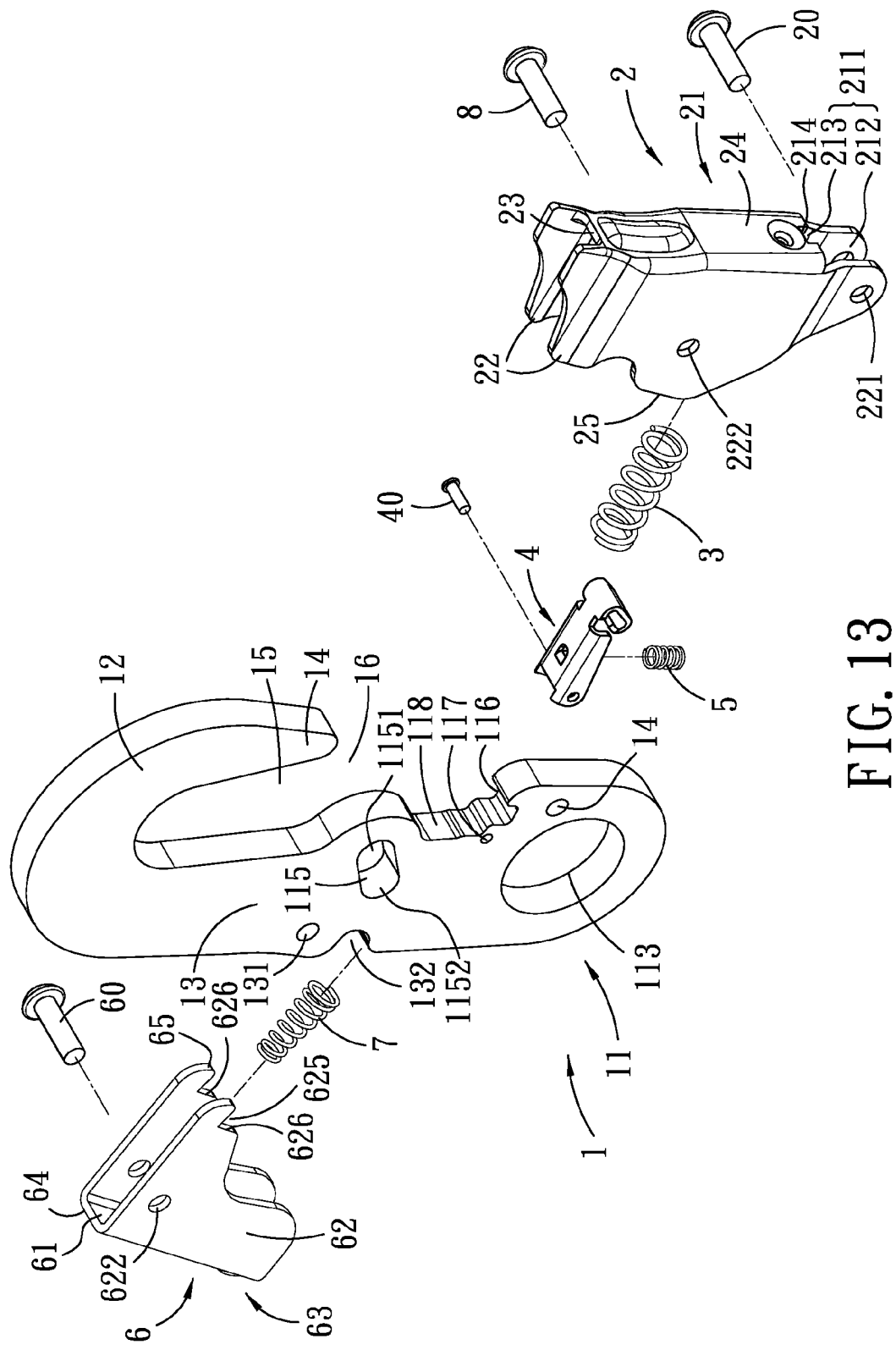
FIG. 13 is an exploded perspective view of the second preferred embodiment of a double locking safety snap hook according to this invention.
Figure 14:
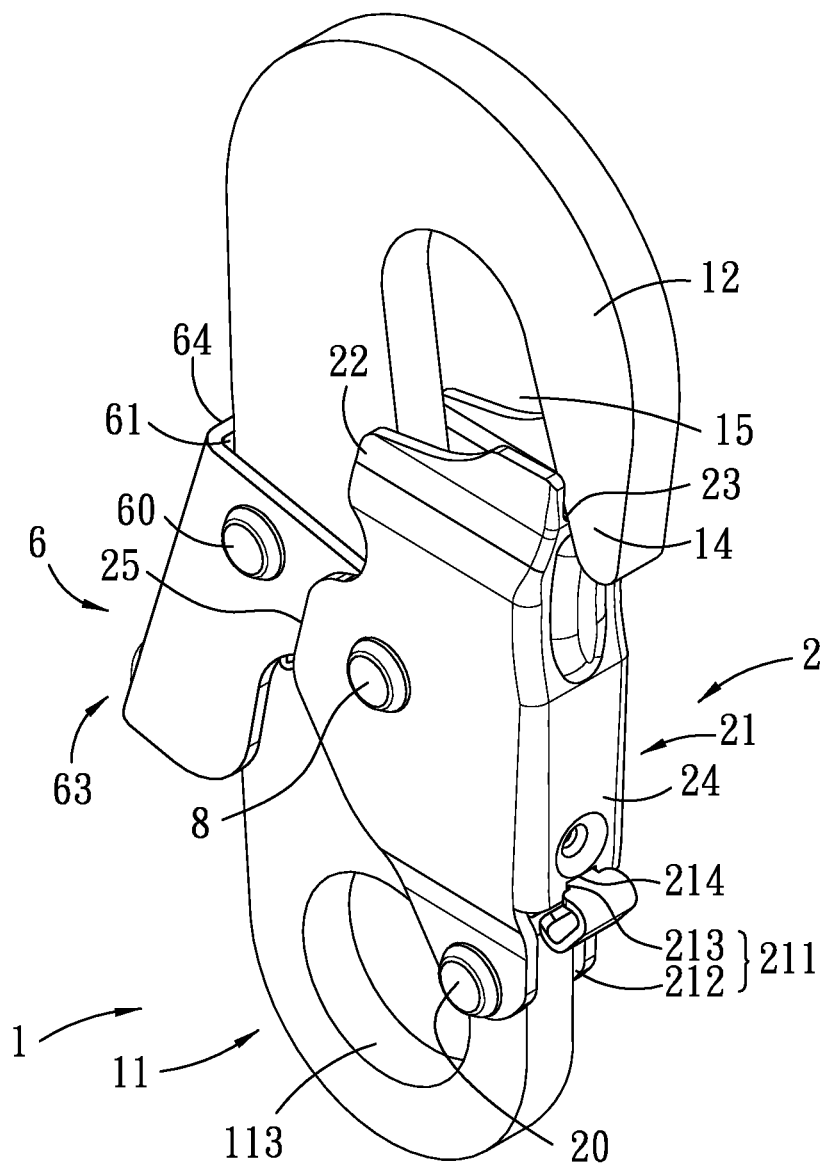
FIG. 14 is an assembled perspective view of the second preferred embodiment.
Figure 15:
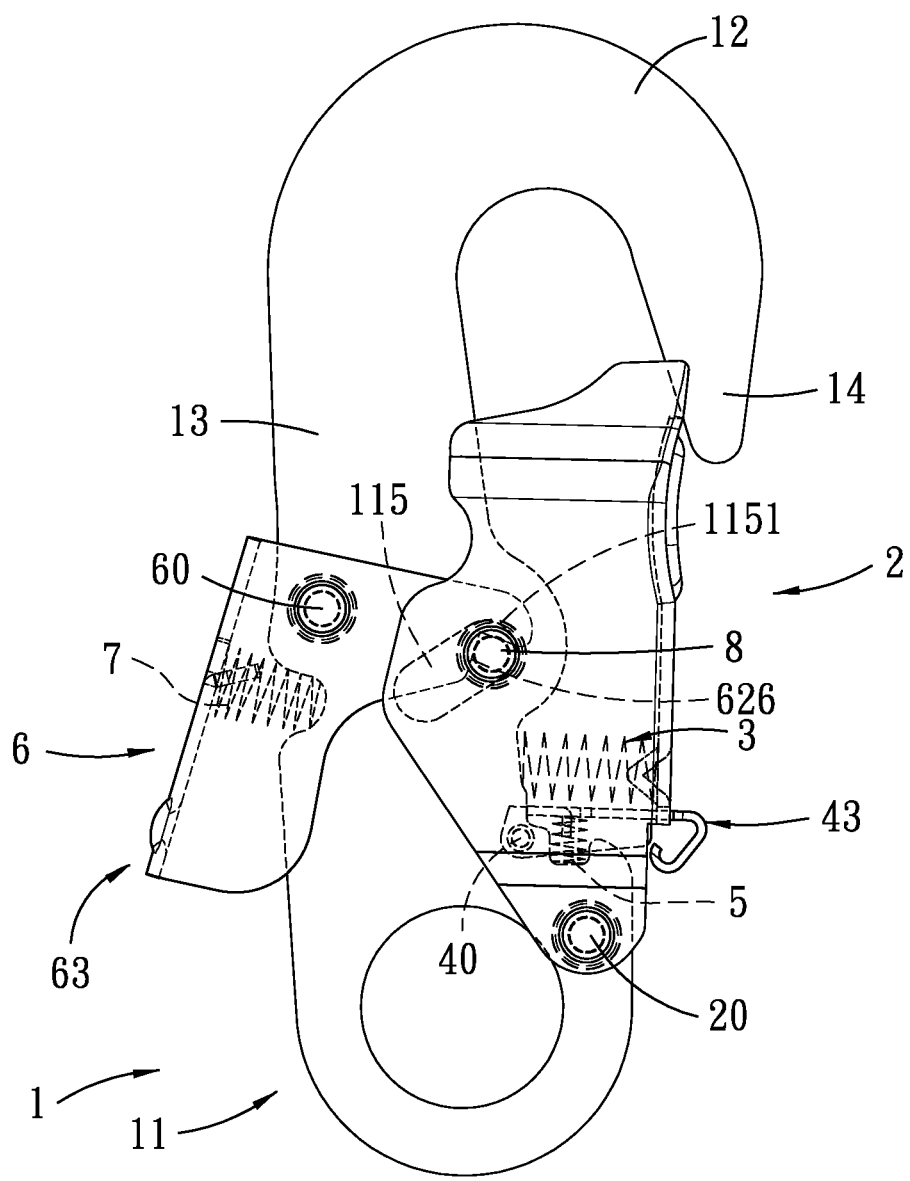
FIG. 15 is a side view of the second preferred embodiment when a hook throat opening is closed.

FIGS. 13, 14, and 15 show the second preferred embodiment of a double locking safety snap hook according to this invention, which differs from the first preferred embodiment in the following.

In this embodiment, the first slide slot 115 is adjacent to the third-spring receiving groove 132, and is straight and inclined. The base 11 further has a first-spring receiving groove 118. The gate 2 is varied in shape, but not changed in function. In this embodiment, the first resilient member 3 is configured as a coiled compression spring, and has a front end abutting against the middle wall 21 of the gate 2, and a rear end received within the first-spring receiving groove 118. The second slide slots 621 (see FIG. 1) are omitted from the locking member 6. In this embodiment, the locking member 6 is configured as a crank, and has a middle wall 61, and two parallel sidewalls 62 extending respectively from two opposite sides of the middle wall 61 toward the shank 13. Each of the sidewalls 62 has a pinching end 626, and an operating end allowing for manual operation. Each of the pinching ends 626 defines an arresting notch 625. The operating ends of the sidewalls 62 constitute the free end 63 of the locking member 6.

With particular reference to FIG. 15, when the safety snap hook is in a closed state, the sliding rod 8 is seized at the upper end 1151 of the first slide slot 115 by the pinching ends 626 of the sidewalls 62 of the locking member 6. The free end 63 of the locking member 6 can be pressed to separate the pinching ends 626 from the sliding rod 8, so as to allow for sliding movement of the sliding rod 8 to the lower end 1152 of the first slide slot 115 when the hook throat opening 16 is to be opened.

The hook throat opening 16 can be opened by a first method or a second method.

Figure 16:
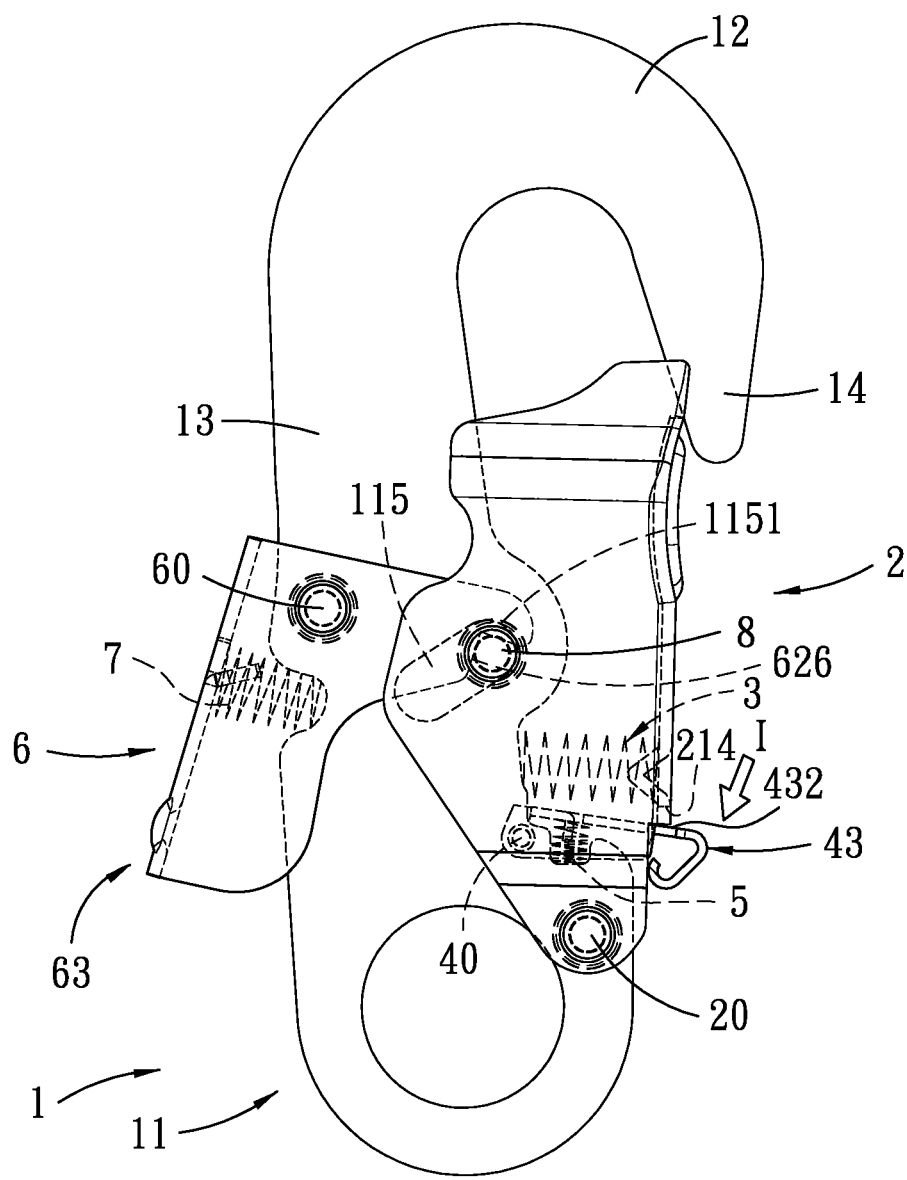
FIG. 16 is a view similar to FIG. 15 but illustrating a first step of a first method for opening the hook throat opening.
Figure 17:
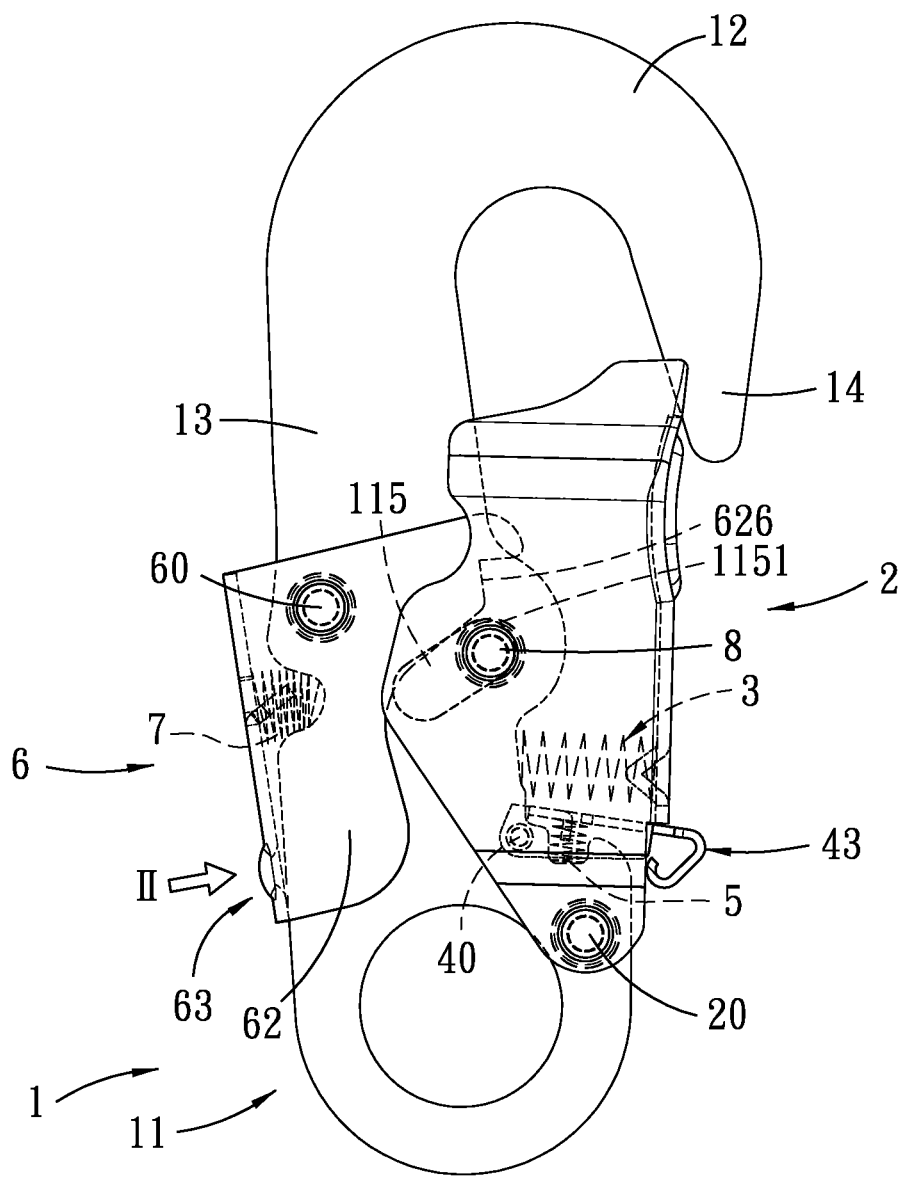
FIG. 17 is a view similar to FIG. 15 but illustrating a second step of the first method for opening the hook throat opening.
Figure 18:
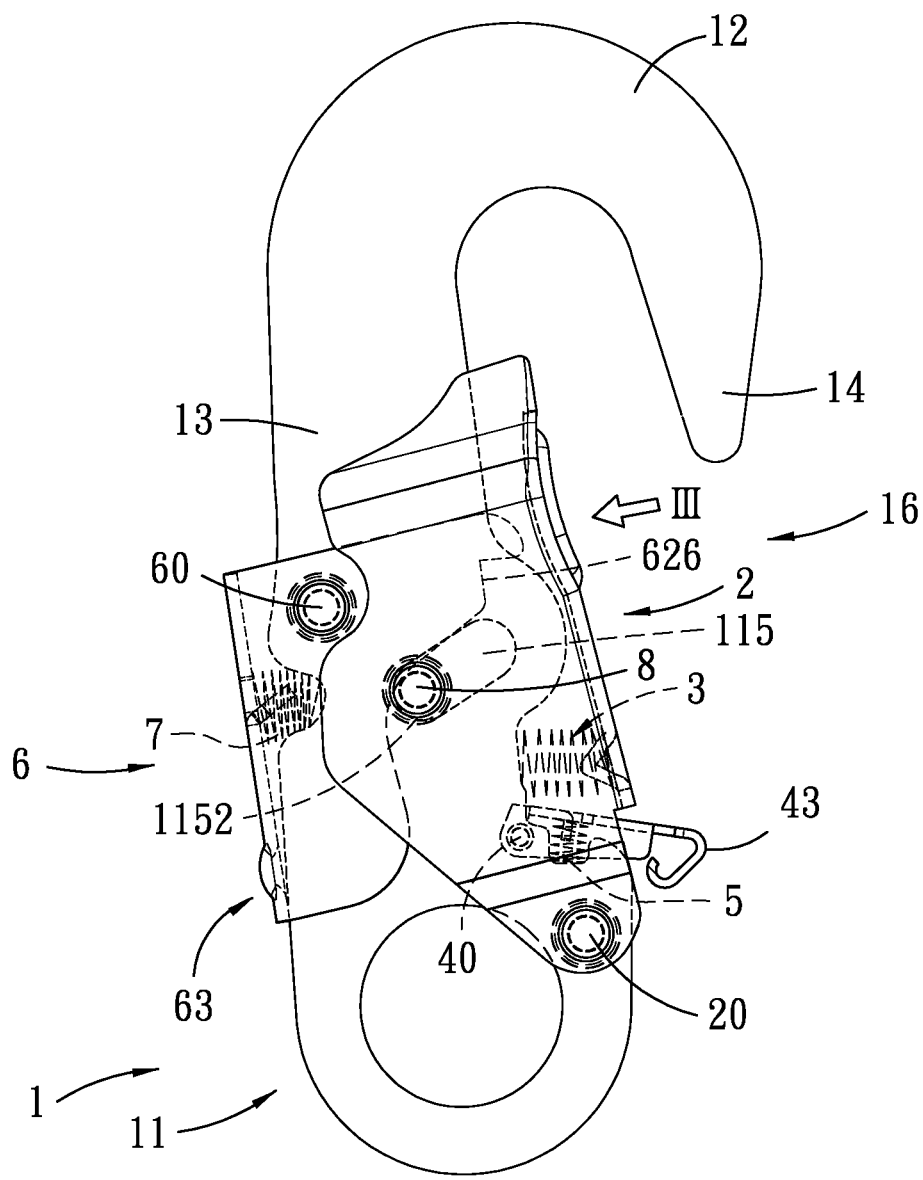
FIG. 18 is a view similar to FIG. 15 but illustrating a third step of the first method for opening the hook throat opening.

The first method of the second preferred embodiment includes the following steps:
1. as shown in FIG. 16, pressing the free end 43 of the trigger 4 in a direction (I) to rotate about the second pivot 40 toward the base portion 11 to contact the base portion 11 so as to remove the neck portion 432 of the pressing section 43 from the locking surface 214, so that the pressing section 43 is disposed within the main aperture section 212 of the aperture 211, and abuts against the base portion 11;
2. as shown in FIG. 17, pressing the free end 63 of the locking member 6 in a direction (II) to rotate about the third pivot 60 to contact the base portion 11, so as to separate the pinching ends 626 of the sidewalls 62 of the locking member 6 from the sliding rod 8; and
3. as shown in FIG. 18, applying a force to the gate 2 in a direction (III) to rotate about the first pivot 20 to thereby remove the gate 2 from the hook throat opening 16, such that the sliding rod 8 moves from the upper end 1151 of the first slide slots 115 toward the lower end 1152 of the first slide slots 115.

Figure 19:
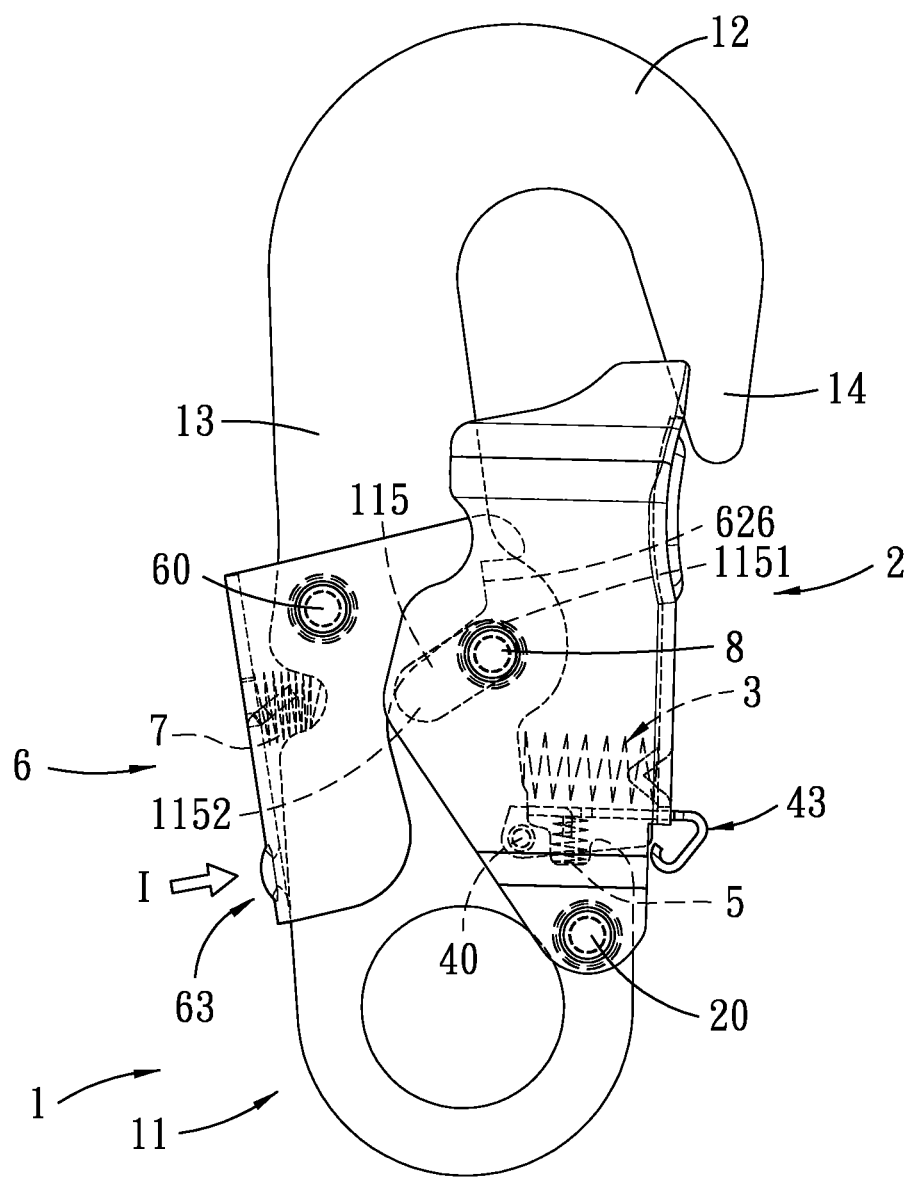
FIG. 19 is a view similar to FIG. 15 but illustrating a first step of a second method for opening the hook throat opening.
Figure 20:
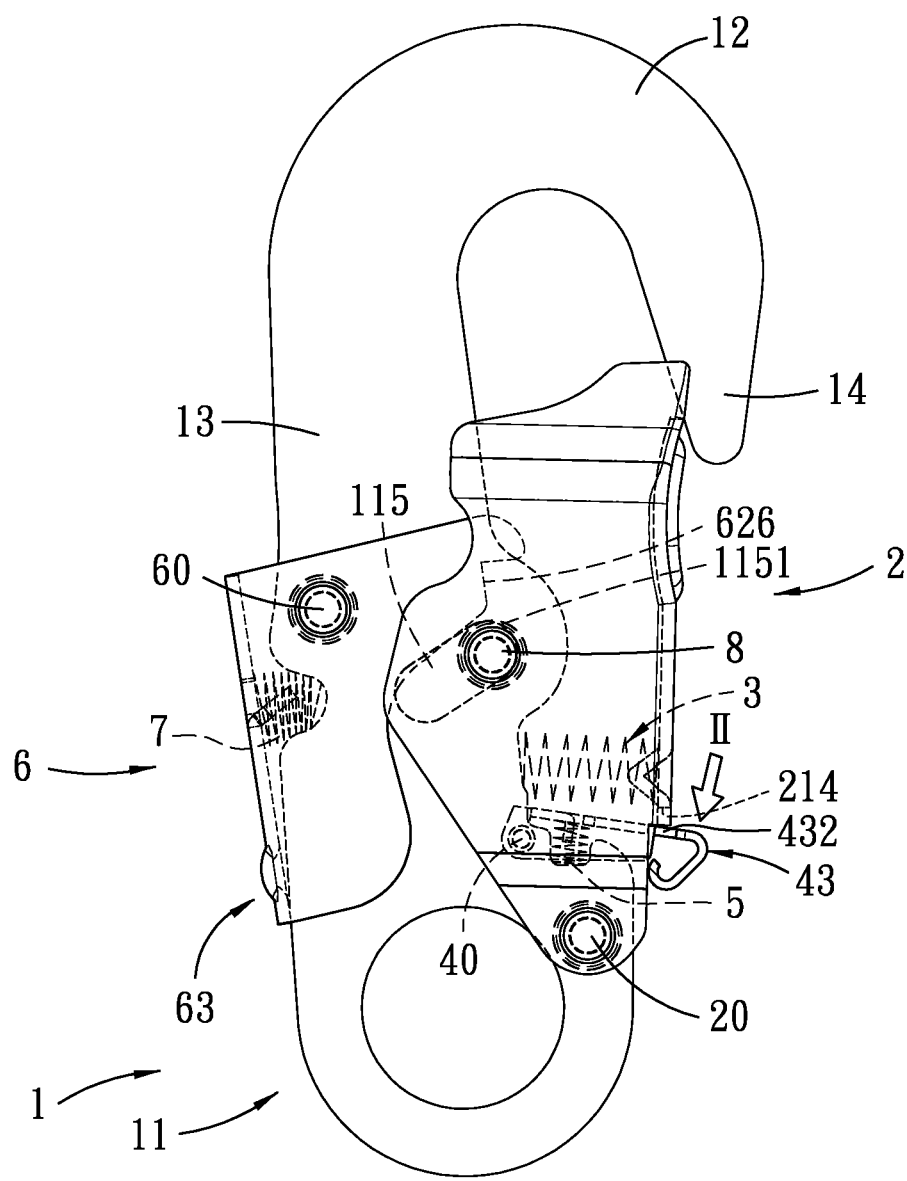
FIG. 20 is a view similar to FIG. 15 but illustrating a second step of the second method for opening the hook throat opening.
Figure 21:
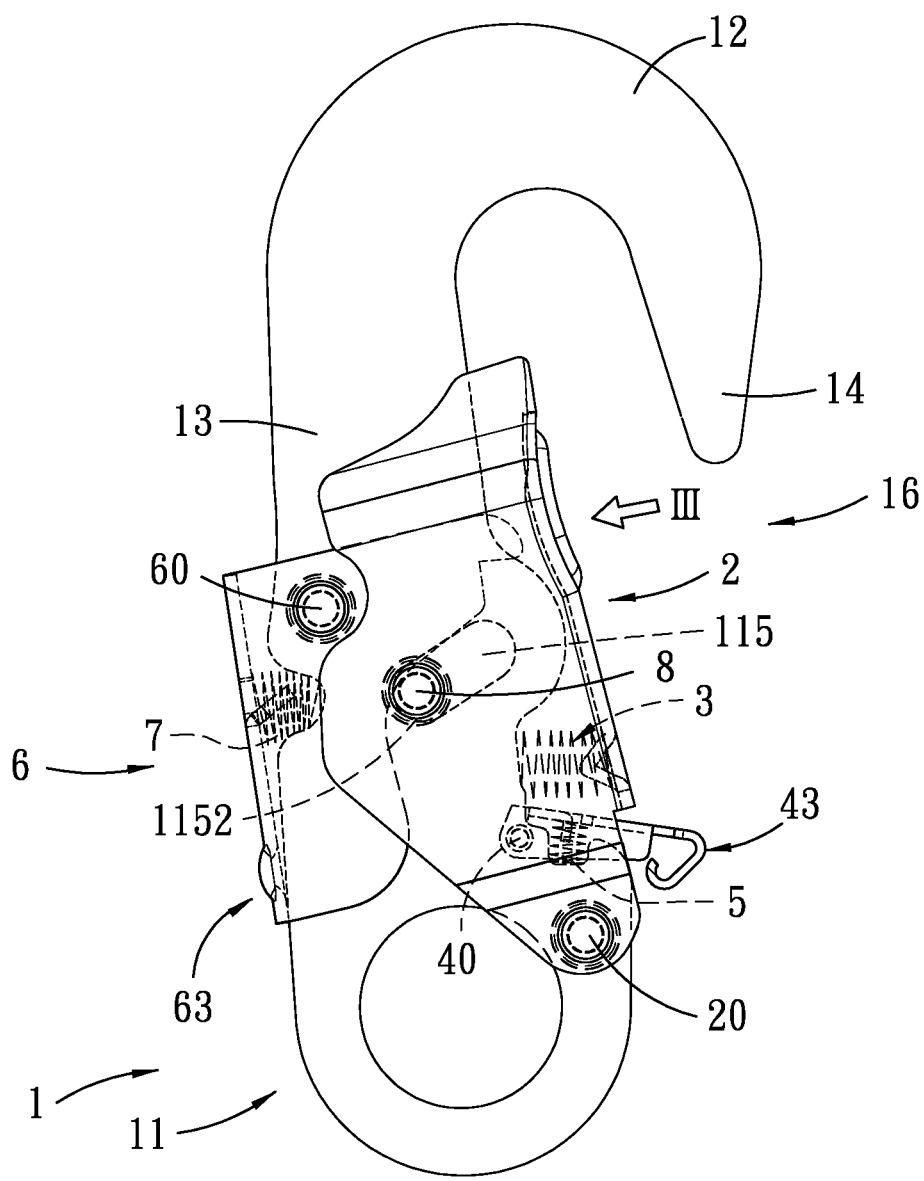
FIG. 21 is a view similar to FIG. 15 but illustrating a third step of the second method for opening the hook throat opening.

The second method of the second preferred embodiment includes the following steps:
1. as shown in FIG. 19, pressing the free end 63 of the locking member 6 in a direction (I) to rotate about the third pivot 60 to contact the base portion 11, so as to separate the pinching ends 626 of the sidewalls 62 of the locking member 6 from the sliding rod 8;
2. as shown in FIG. 20, pressing the free end 43 of the trigger 4 in a direction (II) to rotate about the second pivot 40 toward the base portion 11 to contact the base portion 11 so as to remove the neck portion 432 of the pressing section 43 from the locking surface 214, so that the pressing section 43 is disposed within the main aperture section 212 of the aperture 211, and abuts against the base portion 11; and
3. as shown in FIG. 21, applying a force to the gate 2 in a direction (III) to rotate about the first pivot 20 to thereby remove the gate 2 from the hook throat opening 16, such that the sliding rod 8 moves from the upper end 1151 of the first slide slots 115 toward the lower end 1152 of the first slide slots 115.

Figure 22:
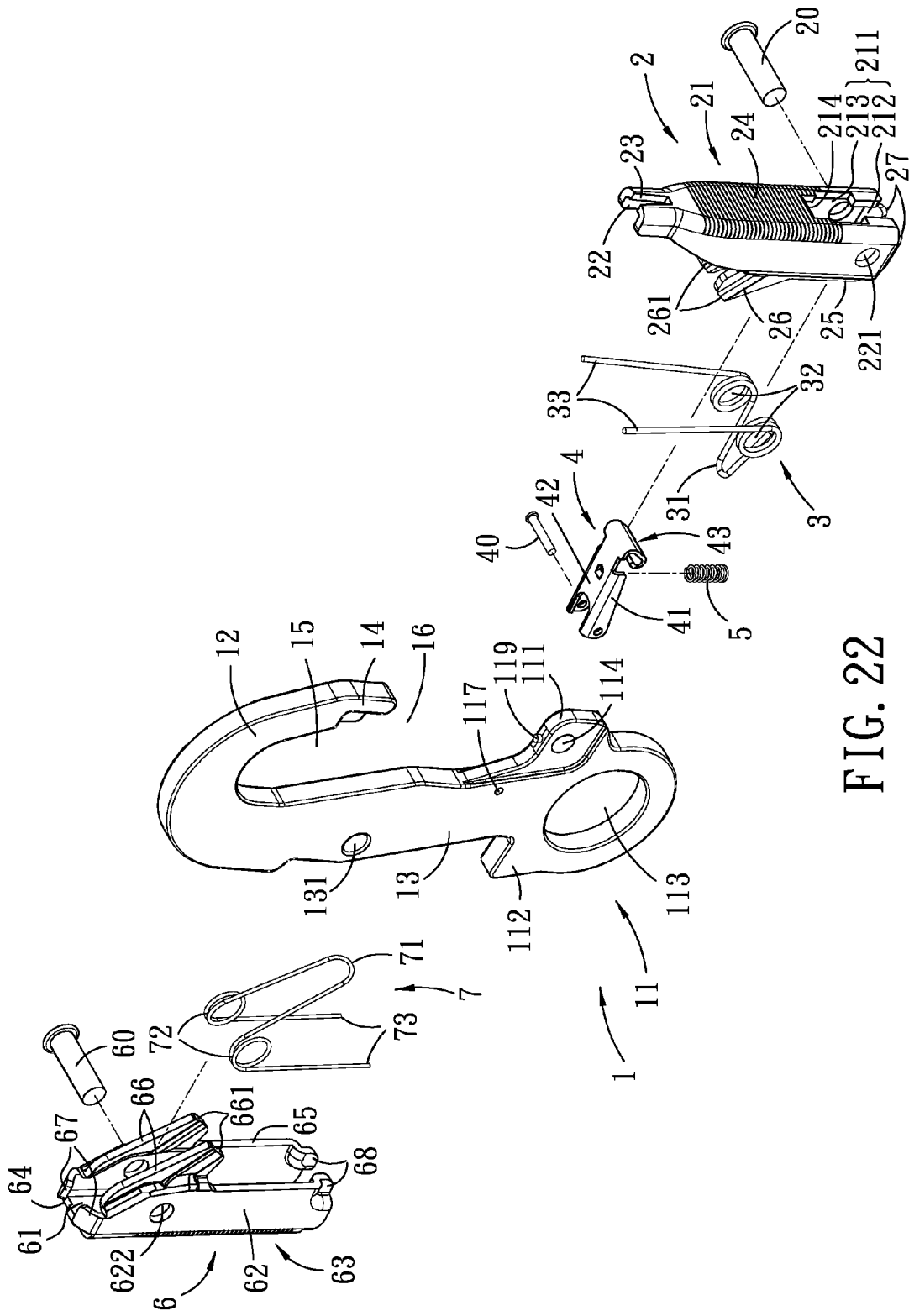
FIG. 22 is an exploded perspective view of the third preferred embodiment of a double locking safety snap hook according to this invention.
Figure 23:
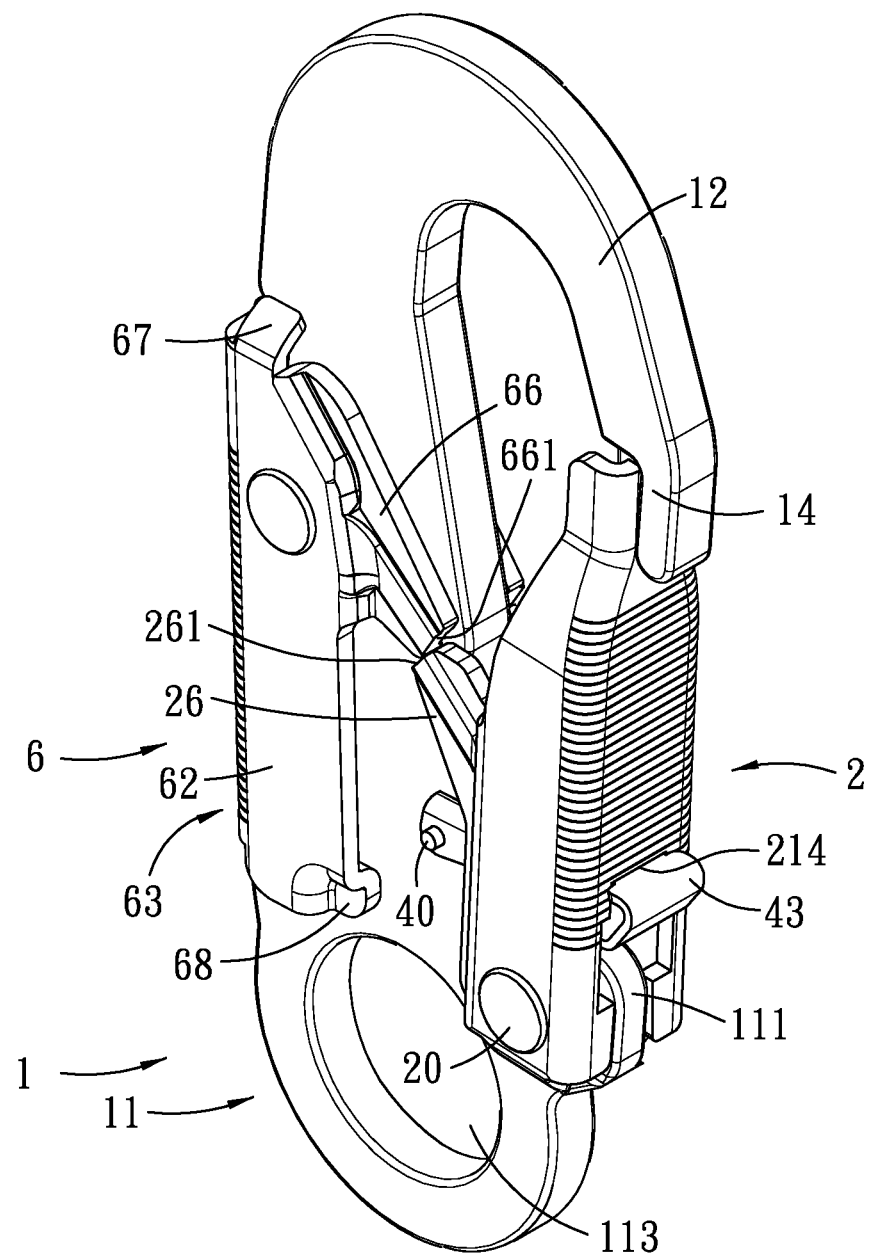
FIG. 23 is an assembled perspective view of the third preferred embodiment.
Figure 24:
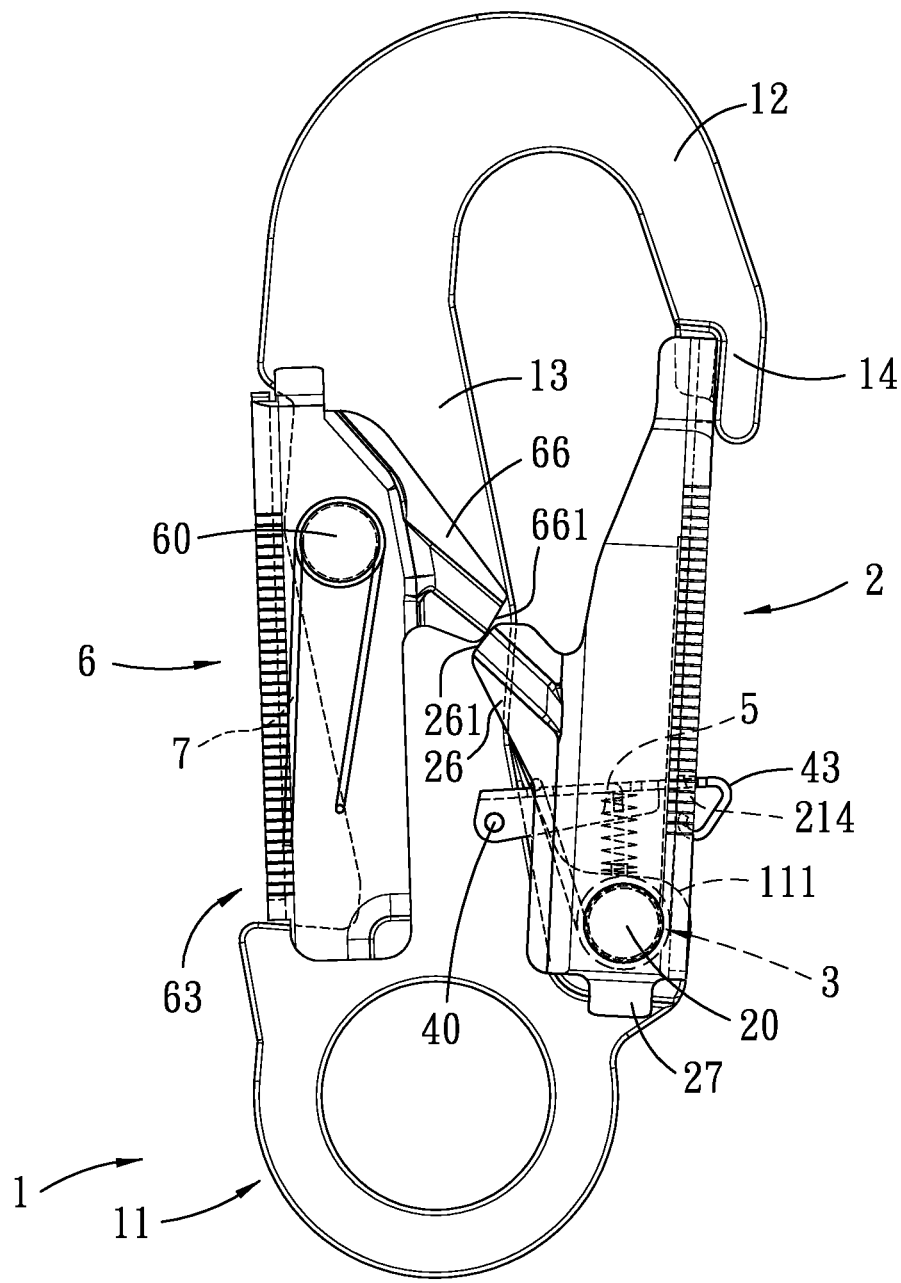
FIG. 24 is a side view of the third preferred embodiment when a hook throat opening is closed.

FIGS. 22, 23, and 24 show the third preferred embodiment of a double locking safety snap hook according to this invention, which differs from the first preferred embodiment in the following. The main difference resides in connection relationship between the gate 2 and the locking member 6. In this embodiment, the sliding rod 8 (see FIG. 1) is omitted, the holes 222 (see FIG. 1) are omitted from the gate 2, and the second slide slots 621 are omitted from the locking member 6.

The body 1 is not formed with the first slide slot 115 (see FIG. 1), and is formed with a positioning post 119 instead of the second-spring receiving groove 116 (see FIG. 1). The lower end of the second resilient member 5 is sleeved on the positioning post 119.

The gate 2 further has an end wall 27 proximate to the base portion 11. The first resilient member 3 is configured as a torsion spring that is sleeved on the first pivot 20 and that abuts against the end wall 27 of the gate 2 and the body 1.

Each of the gate 2 and the locking member 6 further has two stop arms 26, 66 extending respectively and inclinedly from the sidewalls 22, 62. The stop arms 66 of the locking member 6 have distal ends 661 that abut respectively against distal ends 261 of the stop arms 26 of the gate 2 for preventing rotation of the gate 2 relative to the body 1 when the hook throat opening 16 is closed.

The gate 2 further has two end walls 27 extending respectively from lower ends of the sidewalls 22 toward each other to clamp the body 1 therebetween.

The locking member 6 further has two upper clamping walls 67 extending upwardly and inwardly from upper ends of the sidewalls 62, respectively, and two lower clamping walls 68 extending downwardly and inwardly from lower ends of the sidewalls 62. The body 1 is clamped between the upper clamping walls 67 and between the lower clamping walls 68.

The third resilient member 7 is configured as a torsion spring, and has a first end 71 abutting against the shank 13, a coiled portion 72 sleeved on the third pivot 60, and a second end 73 abutting against the locking member 6.

With particular reference to FIG. 24, when the safety snap hook is in a closed state, the free end 63 of the locking member 6 is spaced apart from and adjacent to the shank 13.

The hook throat opening 16 can be opened by a first method or a second method.

Figure 25:
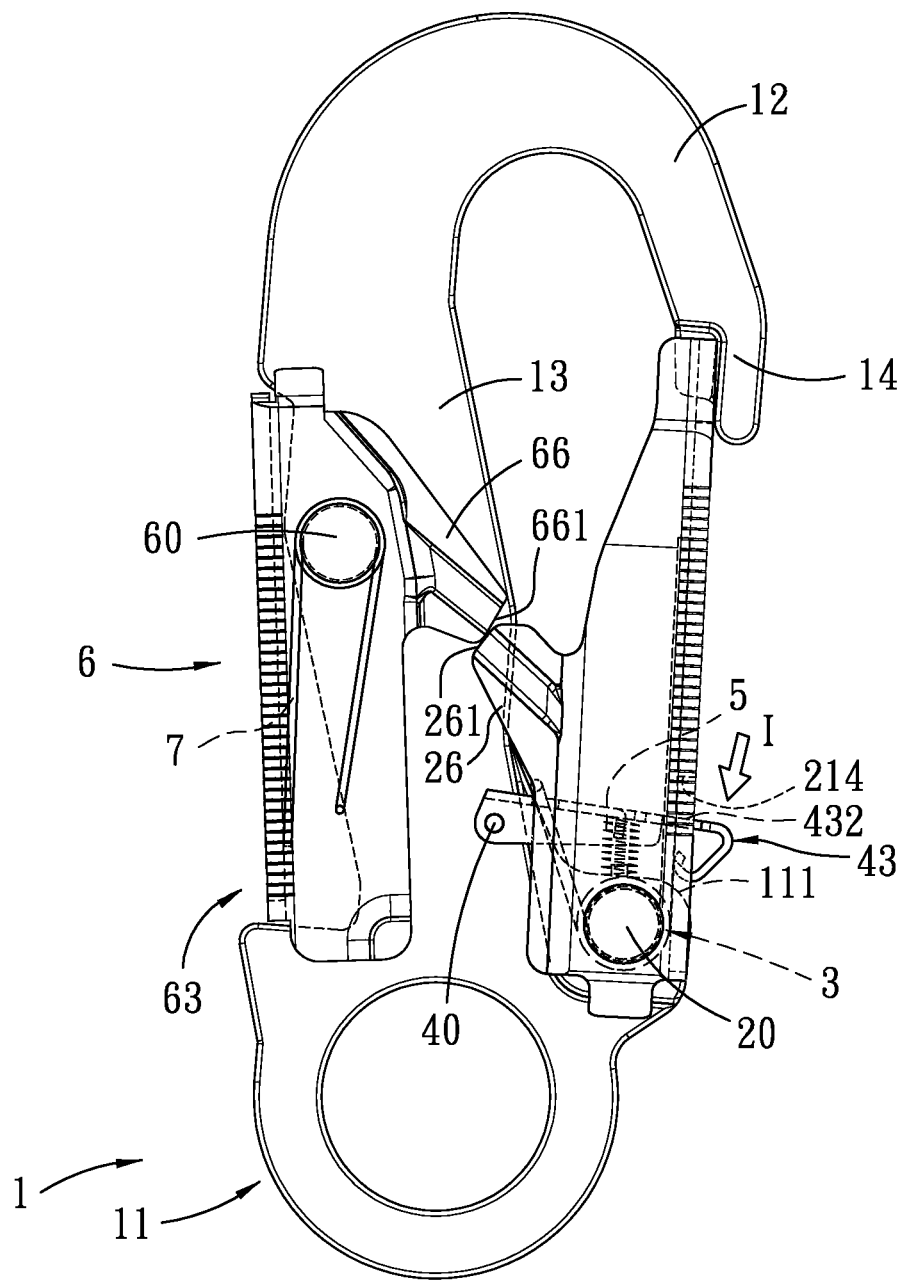
FIG. 25 is a view similar to FIG. 24 but illustrating a first step of a first method for opening the hook throat opening.
Figure 26:
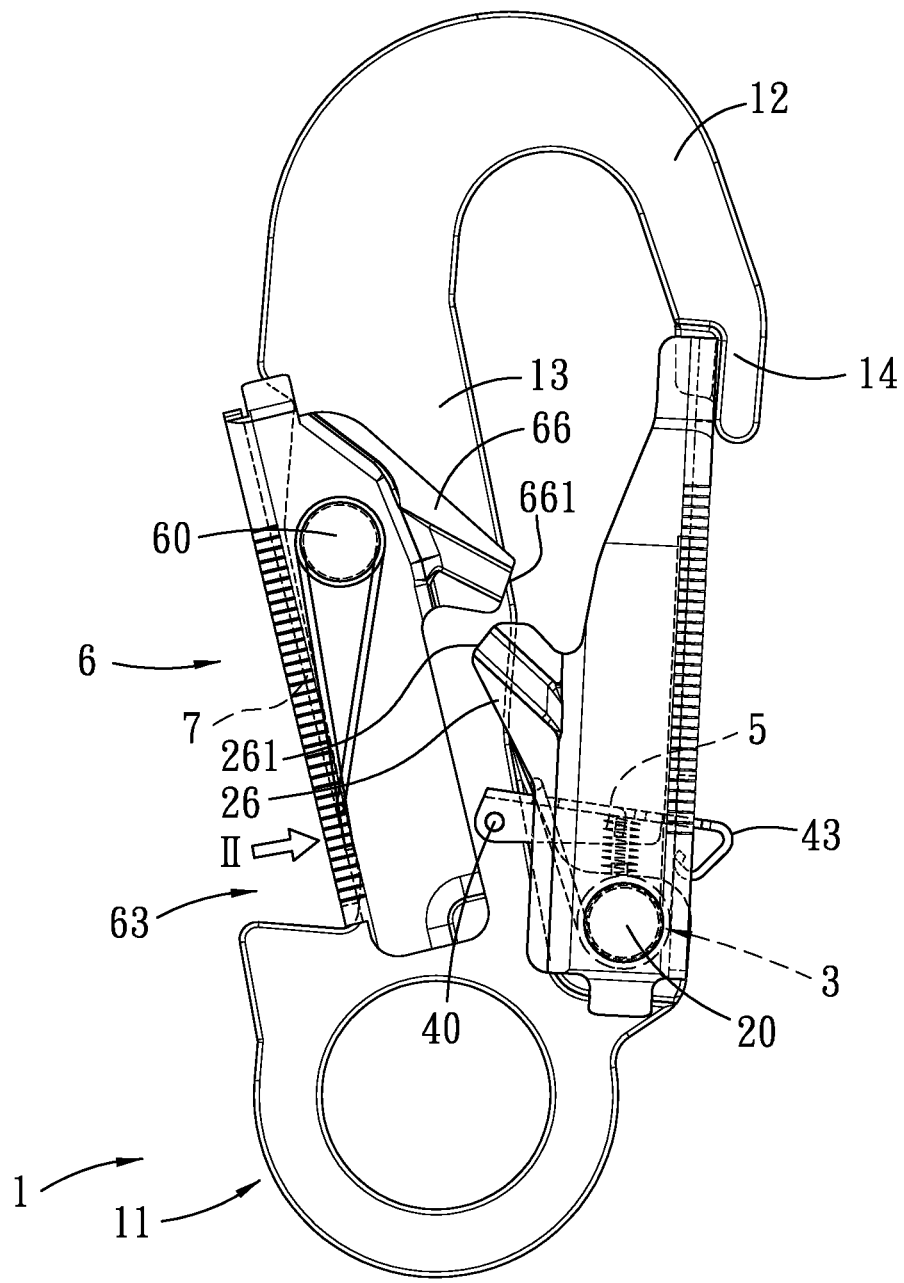
FIG. 26 is a view similar to FIG. 24 but illustrating a second step of the first method for opening the hook throat opening.
Figure 27:
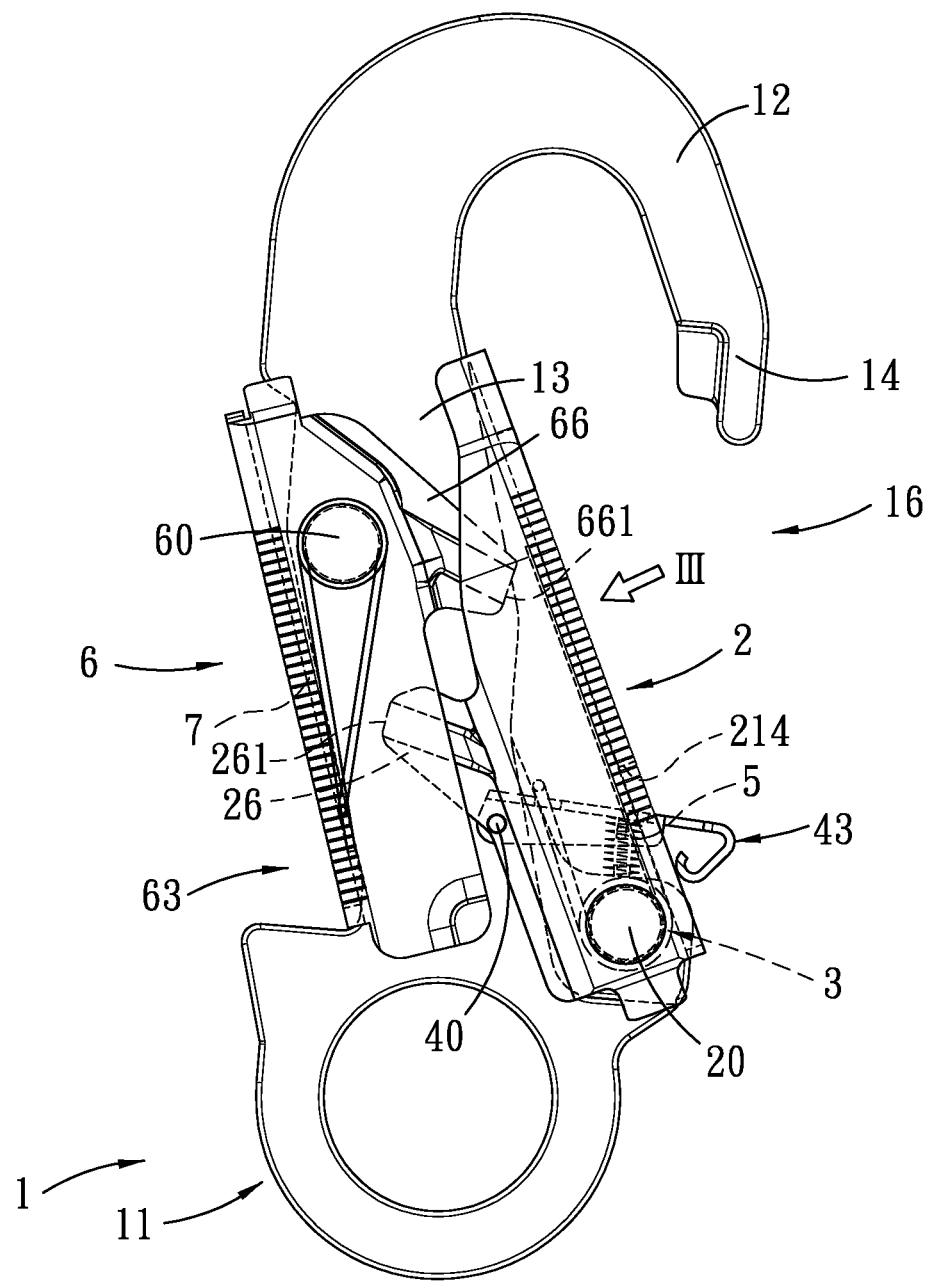
FIG. 27 is a view similar to FIG. 24 but illustrating a third step of the first method for opening the hook throat opening.

The first method of the third preferred embodiment includes the following steps:

1. as shown in FIG. 25, pressing the free end 43 of the trigger 4 in a direction (I) to rotate about the second pivot 40 toward the base portion 11 to contact the base portion 11 so as to remove the neck portion 432 of the pressing section 43 from the locking surface 214, so that the pressing section 43 is disposed within the main aperture section 212 of the aperture 211 and abuts against the base portion 11;
2. as shown in FIG. 26, pressing the free end 63 of the locking member 6 in a direction (II) to rotate about the third pivot 60 to contact the base portion 11, so as to remove the distal ends 661 of the stop arms 66 of the locking member 6 from the distal ends 261 of the stop arms 26 of the gates; and
3. as shown in FIG. 27, applying a force to the gate 2 in a direction (III) to rotate about the first pivot 20 to thereby remove the gate 2 from the hook throat opening 16 until the gate 2 comes into contact the shank 13, so that the hook throat opening 16 is opened fully.

Figure 28:
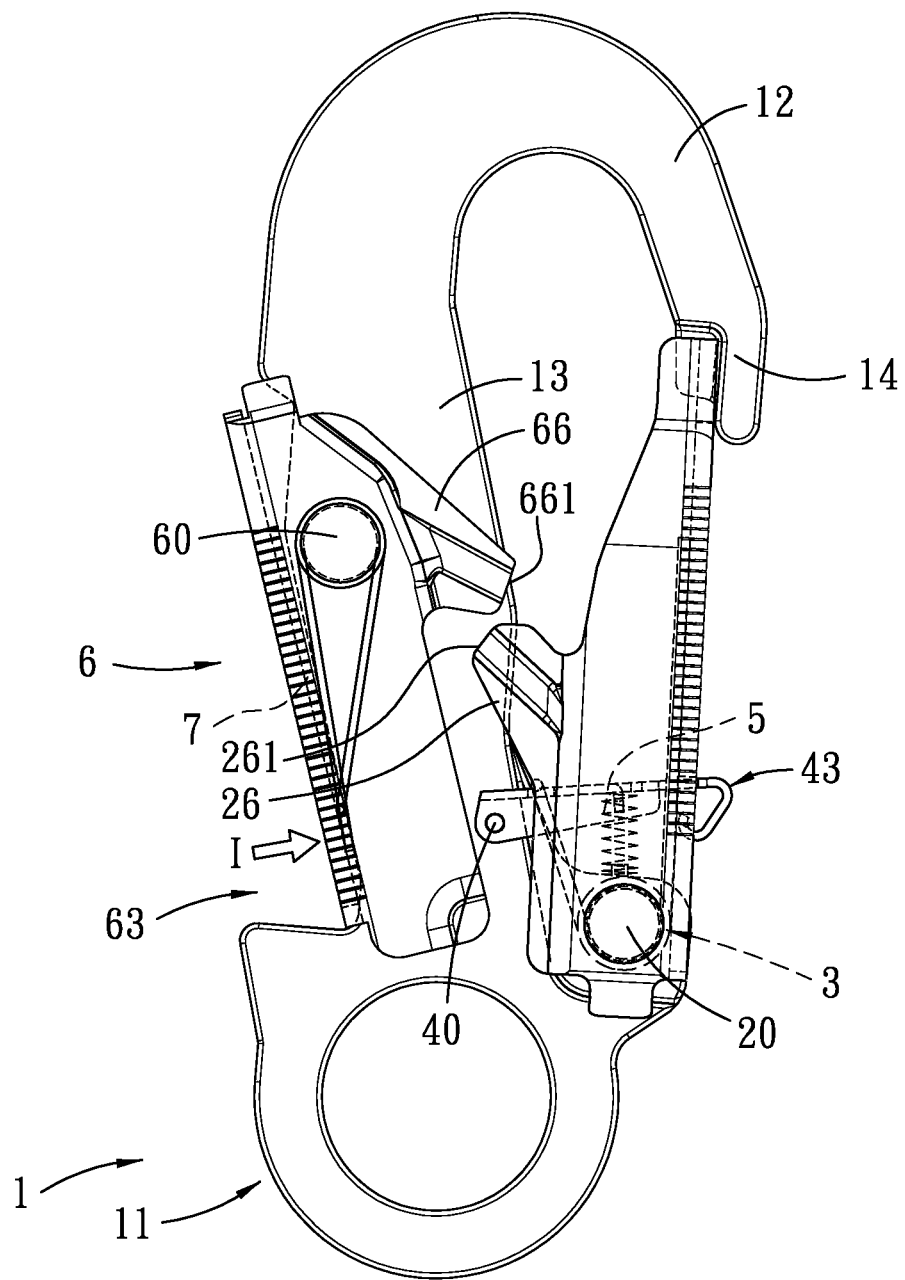
FIG. 28 is a view similar to FIG. 24 but illustrating a first step of a second method for opening the hook throat opening.
Figure 29:
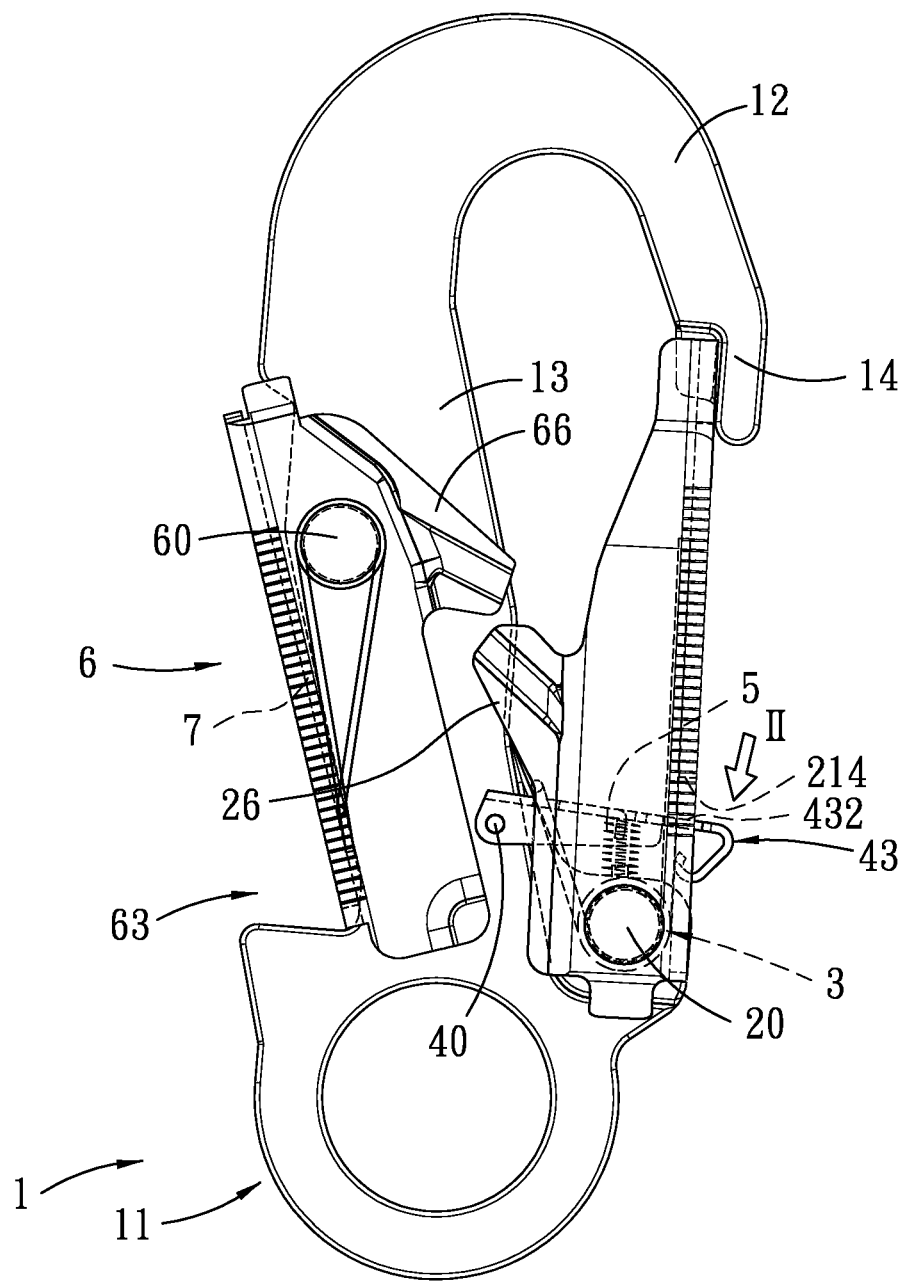
FIG. 29 is a view similar to FIG. 24 but illustrating a second step of the second method for opening the hook throat opening.
Figure 30:
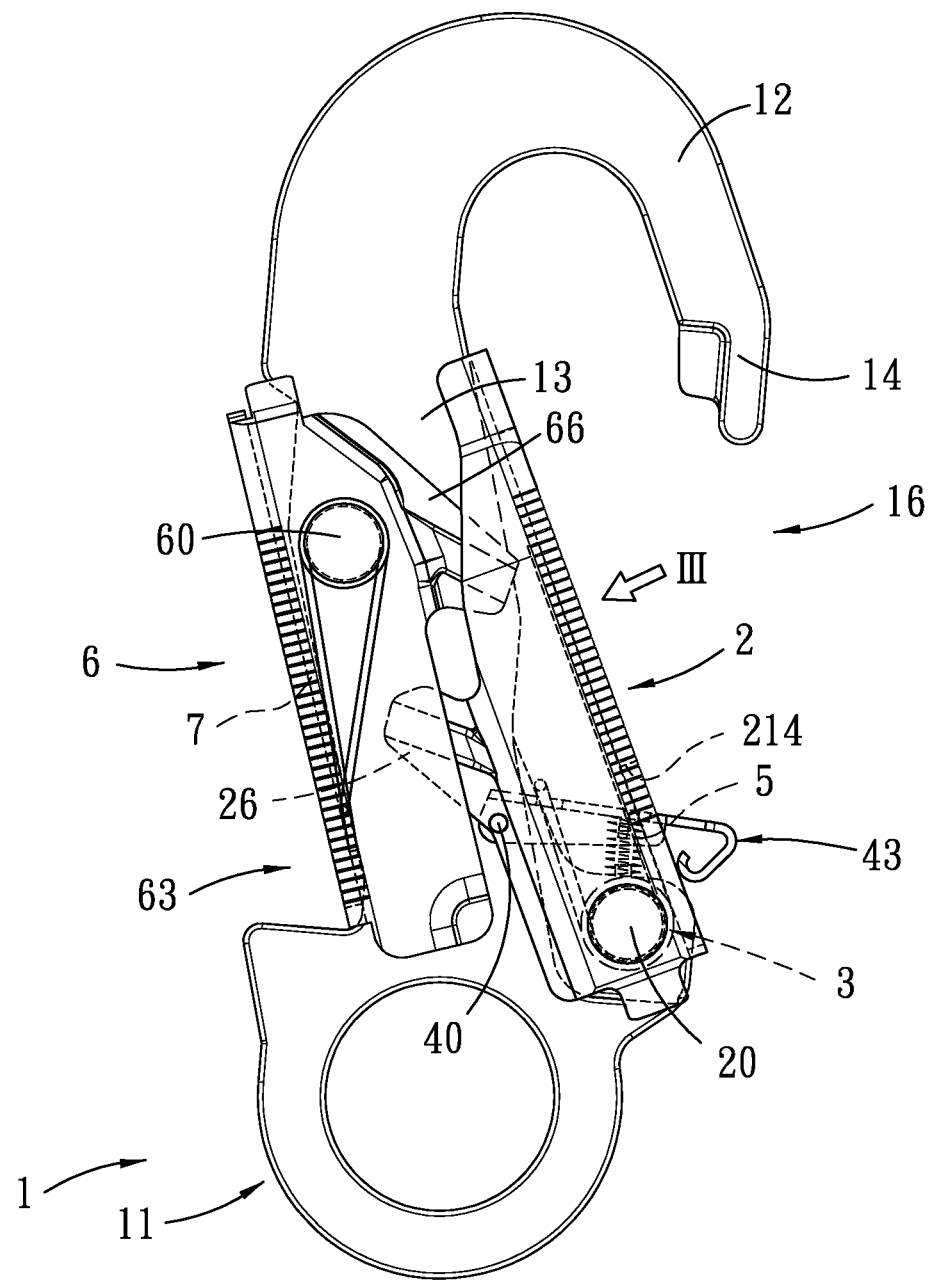
FIG. 30 is a view similar to FIG. 24 but illustrating a third step of the second method for opening the hook throat opening.

The second method of the third preferred embodiment includes the following steps:

1. as shown in FIG. 28, pressing the free end 63 of the locking member 6 in a direction (I) to rotate about the third pivot 60 to contact the base portion 11, so as to remove the distal ends 661 of the stop arms 66 of the locking member 6 from the distal ends 261 of the stop arms 26 of the gates;
2. as shown in FIG. 29, pressing the free end 43 of the trigger 4 in a direction (II) to rotate about the second pivot 40 toward the base portion 11 to contact the base portion 11 so as to remove the neck portion 432 of the pressing section 43 from the locking surface 214, so that the pressing section 43 is disposed within the main aperture section 212 of the aperture 211 and abuts against the base portion 11; and
3. as shown in FIG. 30, applying a force to the gate 2 in a direction (III) to rotate about the first pivot 20 to thereby remove the gate 2 from the hook throat opening 16 until the gate 2 comes into contact the shank 13, so that the hook throat opening 16 is opened fully.

To sum up, the hook throat opening 16 can be opened only when the free ends 42, 63 of the trigger 4 and the locking member 6 are pressed. As a result, the hook throat opening 16 can be prevented from opening due to inadvertent or undesired contact of the user or an external article with the safety snap hook. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A safety snap hook comprising:
    a body including an base portion, a hook portion defining a hook throat opening, and a shank connected between said base portion and said hook portion;
    a first resilient member;
    a gate connected pivotally to said base portion and biased by said first resilient member to close said hook throat opening, said gate having an aperture adjacent to said base portion, and a locking surface defining an end of said aperture distal from said base portion;
    a second resilient member;
    a trigger connected pivotally to said base portion and extending through said aperture in said gate, said trigger being biased by said second resilient member to press against said locking surface for preventing rotation of said gate relative to said base portion, said trigger having a free end operable to remove said trigger from said locking surface;
    a third resilient member;
    a locking member connected pivotally to said shank and biased by said third resilient member to a locking position whereat rotation of said gate relative to said base portion is prevented, said locking member having a free end operable to move said locking member to a release position whereat rotation of said gate relative to said base portion is allowed;
    wherein, when said free ends of said trigger and said locking member are rotated toward said base portion to remove said trigger from said locking surface and rotate said locking member to said release position, said gate can be rotated relative to said base portion to open said hook throat opening.

2. The safety snap hook as claimed in claim 1, wherein said locking member is connected pivotally to an end of said shank proximate to said hook portion, and said free ends of said trigger and said locking member are spaced apart from and adjacent to said base portion.

3. The safety snap hook as claimed in claim 2, wherein said body is formed with a first slide slot, and said locking member has a middle wall and two parallel sidewalls extending respectively from two opposite sides of said middle wall and formed with aligned second slide slots, each of said first and second slide slots having an upper end and a lower end, said safety space hook further comprising a sliding rod secured to a free end of said gate and extending through said upper ends of said first and second slide slots such that, when said locking member is at said locking position, said lower ends of said second slide slots are misaligned from said lower end of said first slide slot, and when said locking member is at said release position, said lower ends of said second slide slots are aligned with said lower end of said first slide slot, so as to allow said sliding rod to move from said upper ends of said first and second slide slots into said lower ends of said first and second slide slots.

4. The safety snap hook as claimed in claim 1, further comprising a pivot for connecting said gate pivotally to said base portion, said first resilient member being configured as a torsion spring that is sleeved on said pivot and that abuts against said gate and said body.

5. The safety snap hook as claimed in claim 1, wherein:
said aperture has a main aperture section and a positioning section disposed between said main aperture section and said locking surface; and
said trigger further has two parallel sidewalls, a connecting wall connected between and perpendicular to said sidewalls, and a pressing section extending from an end of said connecting wall and constituting said free end of said trigger, said pressing section having a head portion extending outwardly from said aperture, and a neck portion connected between said head portion and said connecting wall and narrower than said head portion and said positioning section of said aperture, the distance between said sidewalls of said trigger being slightly smaller than the width of said main aperture section.

6. The safety snap hook as claimed in claim 1, wherein said second resilient member is configured as a coiled compression spring, and has an upper end abutting against said trigger, and a lower end abutting against said base portion.

7. The safety snap hook as claimed in claim 6, wherein said base portion is formed with a receiving groove, said lower end of said second resilient member being received within said receiving groove.

8. The safety snap hook as claimed in claim 6, wherein said base portion is formed with a positioning post, said lower end of said second resilient member being sleeved on said positioning post.

9. The safety snap hook as claimed in claim 1, wherein said shank is formed with a recess, and said third resilient member is configured as a coiled compression spring, and has one end receiving within said recess, and the other end abutting against said locking member.

10. The safety snap hook as claimed in claim 1, wherein said gate has a middle wall formed with a notch at an upper end thereof, and two parallel sidewalls extending respectively from two opposite sides of said middle wall, and said body further includes a stop flange formed on a distal end of said hook portion, said distal end being received within said notch, said middle wall abutting against said stop flange.

11. The safety snap hook as claimed in claim 1, wherein:
said body is formed with a first slide slot;
said gate further has a middle wall formed with said aperture and said locking surface, and two parallel sidewalls extending respectively from two opposite sides of said middle wall toward said shank;

said locking member is configured as a crank, and further has a middle wall, and two parallel sidewalls extending respectively from two opposite sides of said middle wall toward said shank, each of said sidewalls having a pinching end, and an operating end allowing for manual operation, said pinching ends of said sidewalls constituting said free end of said locking member; and
said safety snap hook further comprises a sliding rod connected fixedly to said sidewalls of said gate and extending movably through said first slide slot and seized at one end of said first slide slot by said pinching ends of said sidewalls of said locking member, said locking member being operable to separate from said sliding rod so as to allow for sliding movement of said sliding rod to the other end of said first slide slot when opening said hook throat opening.

12. The safety snap hook as claimed in claim 1, wherein:
said base portion of said body has a receiving groove;
said gate further has a middle wall formed with said aperture and said locking surface, and two parallel sidewalls extending respectively from two opposite sides of said middle wall toward said shank; and
said first resilient member is configured as a coiled compression spring, and has one end abutting against said middle wall of said gate, and the other end received within said receiving groove in said base portion.

13. The safety snap hook as claimed in claim 1, wherein:
said shank of said body is formed with a receiving groove;
said locking member further has a middle wall formed with said aperture and said locking surface, and two parallel sidewalls extending respectively from two opposite sides of said middle wall toward said shank; and
said third resilient member is configured as a coiled compression spring, and has one end abutting against said middle wall of said locking member, and the other end received within said receiving groove in said shank.

14. The safety snap hook as claimed in claim 1, wherein each of said gate and said locking member further has a middle wall, two parallel sidewalls extending respectively from two opposite sides of said middle wall, and two stop arms extending respectively from said sidewalls in a direction away from said middle wall, said stop arms of said locking member contacting respectively said stop arms of said gate for preventing rotation of said gate relative to said body, said stop arms of said locking member being removable from said stop arms of said gate by operating said free end of said locking member so as to allow for rotation of said gate relative to said body.

15. The safety snap hook as claimed in claim 1, further comprising a pivot for connecting said locking member pivotally to said body, said locking member further having a middle wall, and two parallel sidewalls extending respectively from two opposite sides of said middle wall toward said shank, said third resilient member being configured as a torsion spring that is sleeved on said pivot and that abuts against said locking member and said body.

\* \* \* \* \*